United States Patent [19]

Yoshinada et al.

[11] Patent Number: 5,141,785
[45] Date of Patent: Aug. 25, 1992

[54] RECORDING MEDIUM

[75] Inventors: Kazuo Yoshinada, Machida; Toshikazu Ohnishi, Tokyo; Yutaka Kurabayashi; Tsuyoshi Santoh, both of Yokohama, all of Japan

[73] Assignee: Canon Kabushiki Kaisha, Tokyo, Japan

[21] Appl. No.: 508,697

[22] Filed: Apr. 13, 1990

[30] Foreign Application Priority Data

Apr. 13, 1989 [JP] Japan .................. 1-91785

[51] Int. Cl.⁵ ........................... C09K 19/00
[52] U.S. Cl. ........................... 428/1; 428/64; 428/65; 428/913; 430/945; 346/76 L; 346/135.1; 359/36; 359/43; 359/104
[58] Field of Search ............ 428/1, 64, 65, 913; 350/351, 330, 350 S; 430/945; 346/76 L, 135.1

[56] References Cited

U.S. PATENT DOCUMENTS

| 4,734,359 | 3/1988 | Oguchi et al. | 430/945 |
| 4,752,820 | 6/1988 | Kuroiwa et al. | 350/351 |
| 4,777,492 | 10/1988 | Ohnishi et al. | 346/135 |
| 4,946,261 | 8/1990 | Yaegashi et al. | 350/353 |

FOREIGN PATENT DOCUMENTS

| 0235748 | 9/1987 | European Pat. Off. | 428/1 |
| 010930 | 1/1984 | Japan | 428/1 |
| 035989 | 2/1984 | Japan | 428/1 |
| 107448 | 5/1987 | Japan | 428/1 |
| 154340 | 7/1987 | Japan | 428/1 |

OTHER PUBLICATIONS

Patent Abstracts of Japan, vol. 10, No. 368 (M-543) Dec. 9, 1986.
Patent Abstracts of Japan, vol. 10, No. 202 (P-477) Jul. 15, 1986.

Primary Examiner—B. Hamilton Hess
Assistant Examiner—Elizabeth Evans
Attorney, Agent, or Firm—Fitzpatrick, Cella, Harper & Scinto

[57] ABSTRACT

The present invention relates to a recording medium comprising a plane substrate and a recording layer containing a polymer liquid crystal compound, wherein said recording layer containing a polymer liquid crystal compound has a groove.

8 Claims, 3 Drawing Sheets

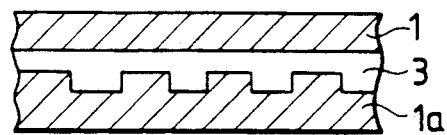
FIG. 6
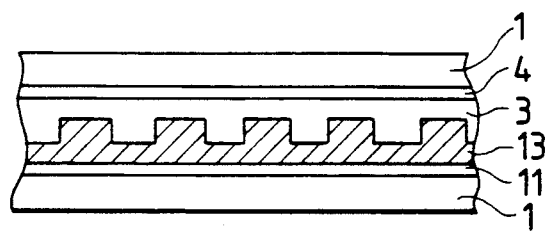
FIG. 7
FIG. 8
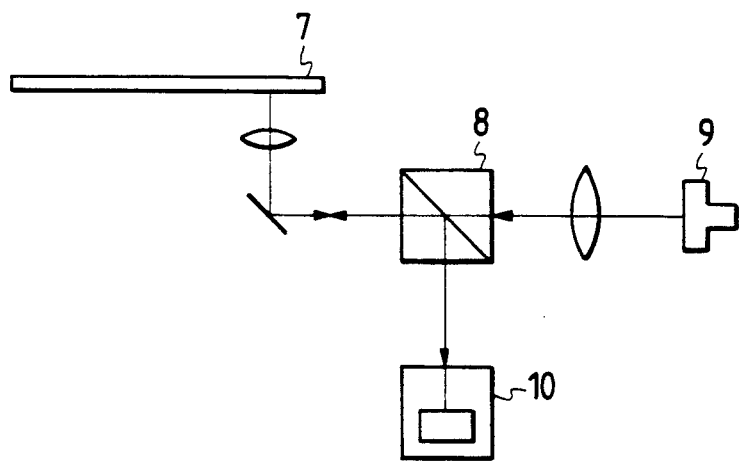

RECORDING MEDIUM

BACKGROUND OF THE INVENTION

1. Field of the Invention

The present invention relates to a recording medium capable of reversibly and optically recording data in a very large capacity. Particularly, it relates to a recording medium by use of a polymer liquid crystal compound.

2. Related Background Art

Nowadays, optical recording systems have been put into practical use because of their large capacity and superior capability of random access. A variety of methods are used for the systems, that is, digital audio disks (CD) or laser video disks (LD) have been put into practical use as mediums exclusively used for reproduction. Writing on optical disks (WO) or optical cards (OC) are known as systems by which optical recording can be carried out, including those in which a phase change of a metal thin film is used or those in which a pit form of an organic dye is used.

Researches on rewriting optical disks are also in progress, where attempts are made on practical utilization of those in which magnetooptic effect is used, or those in which a phase change is used. Among them, polymer liquid crystals are also proposed as recording mediums (Japanese Patent Laid-Open No. 59-10930, No. 59-35989 and No. 62-154340). In particular, as a recording system, a system is also proposed in which helical pitch length of a cholesteric polymer liquid crystal is changed or light reflectance is changed in a multiple-value order by the formation of pits in the state of no alignment (Japanese Patent Laid-Open No. 62-107448 and No. 62-12937).

In the above recording mediums, when glass or plastic is used as a substrate, fine tracks must be formed on the substrate so that recording can be stored in a large capacity. Methods of forming tracks on a substrate include a method in which a monomer is coated on a flat substrate, the resulting substrate is made into a given form by the use of a track forming stamper, the monomer is thereafter polymerized, and then the stamper is removed to give a substrate having fine tracks a method in which a resin for forming a substrate is injection-molded into a mold having a stamper forming tracks; and a method in which a substrate is etched to form tracks.

When, however, a recording layer containing a polymer liquid crystal is provided on a substrate having fine tracks to form a recording medium and tracking (i.e., for recording/reproducing/erasing) is carried out thereon, as in the above prior art, there has been the disadvantage that the difference in the refractive index between a material of the substrate or a material that constitutes tracks and the recording layer containing a polymer liquid crystal is so small that no satisfactory tracking can be carried out. As other methods, in order to achieve satisfactory tracking, a groove is formed with a large depth, or a layer to increase reflectance, specifically a semitransparent metal film or a film of a compound with a high refractive index, is provided between a substrate on which tracks have been formed and a recording layer containing a polymer liquid crystal. These methods, however, increase a production cost and lower a contrast and so forth, disadvantageously.

SUMMARY OF THE INVENTION

The present invention was made in order to eliminate such disadvantages involved in the prior art. An object of the present invention is to provide at a low cost a recording medium that can carry out tracking with ease and in a high accuracy, because of grooves formed on a recording layer containing a polymer liquid crystal compound.

Namely, the present invention is a recording medium comprising a recording layer containing a polymer liquid crystal compound, wherein the recording layer containing a polymer liquid crystal compound is characterized by that it has grooves.

The present invention provides a recording medium comprising a plane substrate and a recording layer containing a polymer liquid crystal compound, wherein said recording layer containing a polymer liquid crystal compound has a groove.

The present invention provides further a recording medium comprising a reflective layer and a recording layer containing a polymer liquid crystal compound, wherein said recording layer containing a polymer liquid crystal compound has a groove.

The present invention also provides a method for preparing a recording layer, comprising the steps of providing a substrate with a recording layer containing a polymer liquid crystal compound, and pressing said recording layer with a stamper to form a groove;

the temperature of said recording layer at the time of pressing the recording layer with the stamper being set to be not lower than the glass transition temperature and not higher than the isotropic phase transition temperature of the recording layer.

The present invention still provides a method for preparing a recording layer, comprising the steps of impregnating the interface between a substrate and a stamper having a groove, with a prepolymer yielding polymer liquid crystal compound, and thereafter polymerizing said prepolymer to form a recording layer containing the polymer liquid crystal compound, said recording layer has a groove.

The present invention still further provides a method for preparing a recording layer, comprising the steps of impregnating the interface between a reflective layer and a stamper with a prepolymer yielding liquid crystal compound, and thereafter polymerizing said prepolymer to form a recording layer containing the polymer liquid crystal compound, said recording layer has a groove.

BRIEF DESCRIPTION OF THE DRAWING

FIGS. 6 and 7 each are a diagramatic partial view of the recording medium of the present invention.

FIG. 8 schematically illustrates a recording and reproducing apparatus in which the recording medium of the present invention is used.

DESCRIPTION OF THE PREFERRED EMBODIMENTS

The present invention will be described below in detail.

Figure 1:
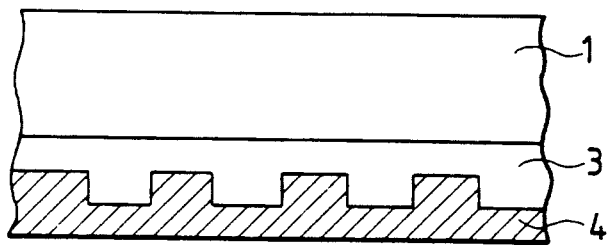
FIG. 1 cross-sectionally illustrates an example of the recording medium of the present invention.

FIG. 1 cross-sectionally illustrates an example of the recording medium of the present invention. In FIG. 1, the recording medium of the present invention comprises the substrate 1, the recording layer 3 formed thereon, containing a polymer liquid crystal compound, and the reflective layer 4 provided on the recording layer 3, wherein the recording layer containing a polymer liquid crystal compound is characterized by that it has grooves.

In this way, the present invention relates to a recording medium having the recording layer containing a polymer liquid crystal compound, in which grooves for tracking are formed on the recording layer containing a polymer liquid crystal compound. Thus, it becomes possible to give an optical phase difference between the land and valley of the groove, and the formation of grooves makes it possible to use conventional laser beam tracking methods, i.e., the systems such as the three-beam method, the push-pull method, the differential push-pull method, and the sample servo method, etc.

The tracking groove formed by the groove on the recording layer containing a polymer liquid crystal compound may be a concentric form or a spiral form in instances in which the recording medium of the present invention is in the form of a disk.

The form of the recording medium of the present invention may not be limited to the above disk-like, and may be a card-like or a tape-like.

The card form is, e.g., provided with a wallet size or a credit card size. Such the cards is used in many kinds of recording mediums for personal uses, for example, in recording mediums for medical diagnosis records and image informations, and in recording mediums for property informations, informations for security and so on.

The depth of the groove formed on the recording layer may be selected depending on the direction of alignment of the polymer liquid crystal compound, the refractive index, the wavelength of a laser beam, etc. It should usually be in the range of from 500 Å to 1 μm. A depth less than 500 Å may give no accuracy of the stamper or resist used for the formation of grooves. A depth more than 1 μm may makes it difficult to form grooves with a stamper especially when the groove width is 10 μm or less, also making it difficult to form grooves at a low cost which is a feature of the present invention. The depth of the groove may more preferably be in the range of from 500 Å to 5,000 Å. The optical phase difference, which is attributable to the groove on the recording layer containing a polymer liquid crystal compound, should be controlled to range of from $1/32 \lambda$ to $\frac{1}{4}\lambda$ with respect to the wavelength $\lambda$ of a laser beam used in the recording-reproducing-erasing of information.

Methods for forming the above-described groove on the recording layer include the compression method, the injection compression method and the injection method. The groove can be formed by the above method after the recording layer containing a polymer liquid crystal compound has been formed on the substrate. It is also possible to form the groove by polymerizing a prepolymer, for example, the 2-P method.

The prepolymer may include additives such as a cross-linking agent, an antioxidizing agent, a polymerization initiator and the like, if it will form a polymer liquid crystal compound by polymerization. A monomer yielding a polymer liquid crystal compound can be preferably used.

The polymer liquid crystal compound that can be used in the present invention include, for example, the compounds shown below.

In the following formulae (1) to (13), $15 > n \geq 1$.

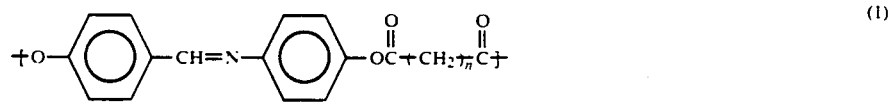

(1)

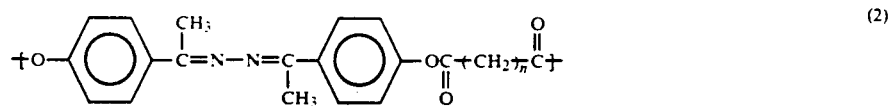

(2)

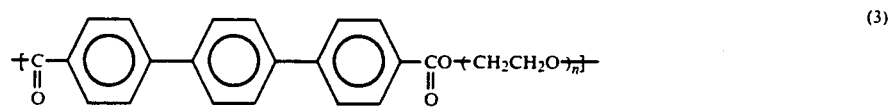

(3)

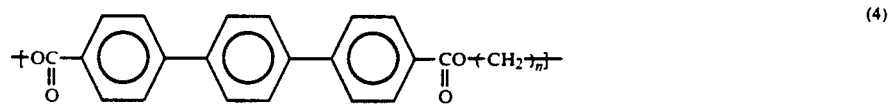

(4)

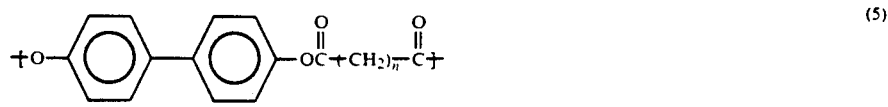

(5)

-continued
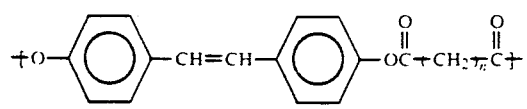 (6)
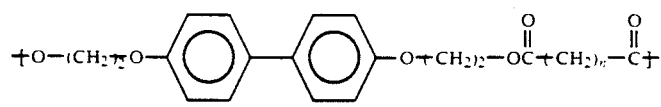 (7)
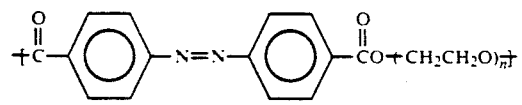 (8)
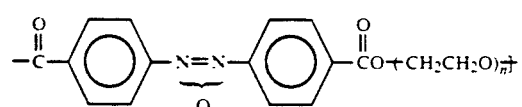 (9)
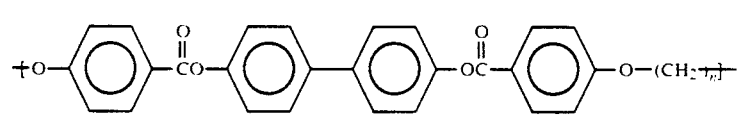 (10)
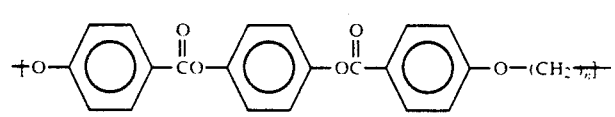 (11)
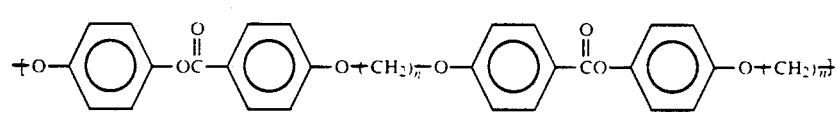 (12)
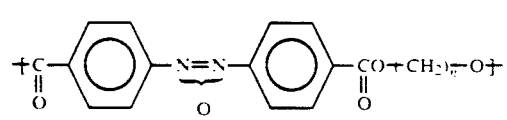 (13)
In the following formulae (14) to (17), p=5 to 1,000, $P_1+P_2$=5 to 1,000, q=1 to 16, $q_1$=1 to 16, and $q_2$=1 to 16.
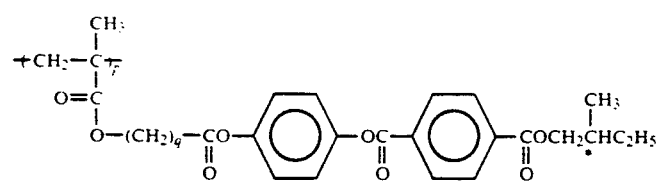 (14)
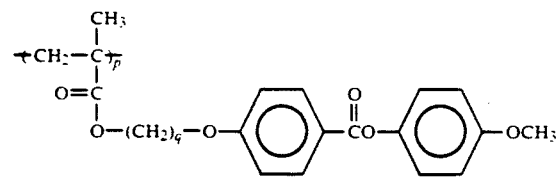 (15)
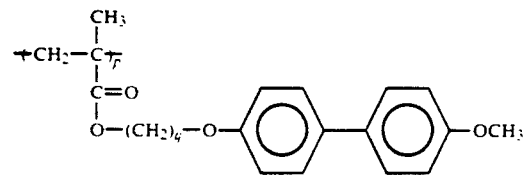 (16)

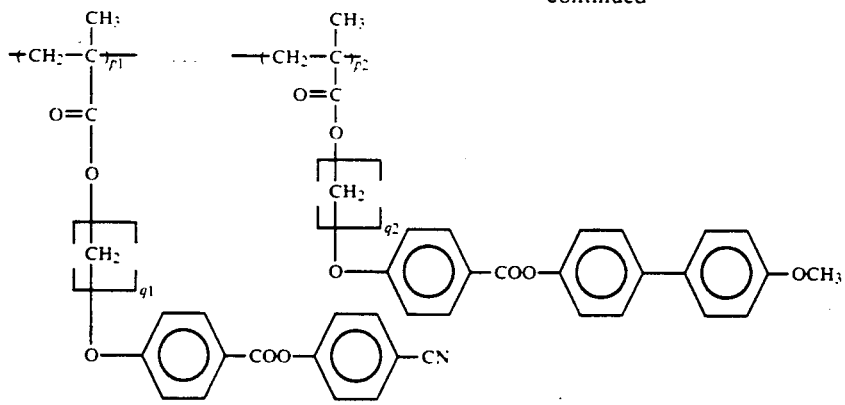
(17)
In the following formulae (18) to (60), the carbon marked with * represents an asymmetric carbon center, and n = 5 to 1,000.
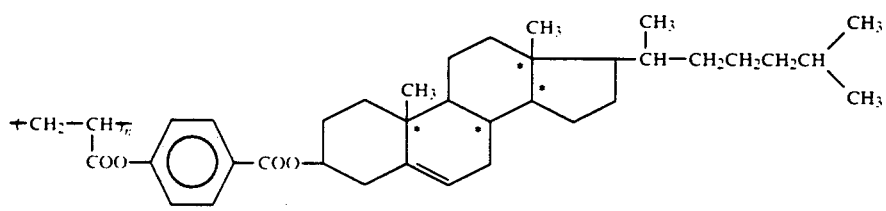
(18)
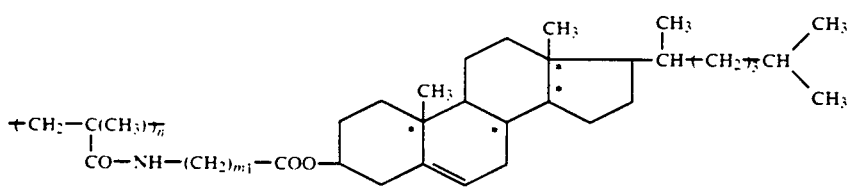
(19)
($m_1 = 2 \sim 10$)
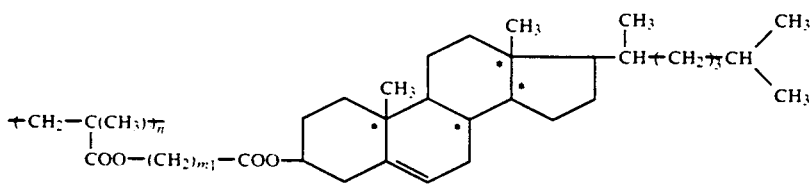
(20)
($m_1 = 2 \sim 10$)
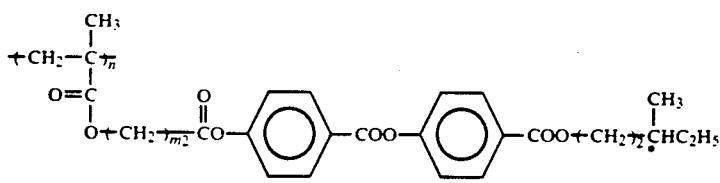
(21)
($m_2 = 2 \sim 15$)
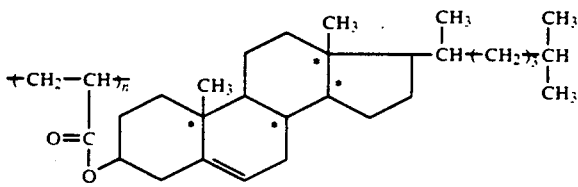
(22)

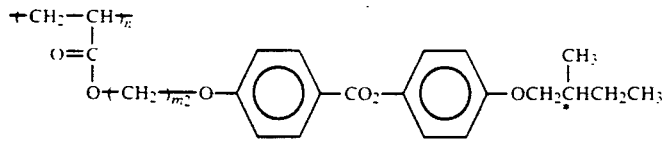
(23)
(m₂ = 2~15)
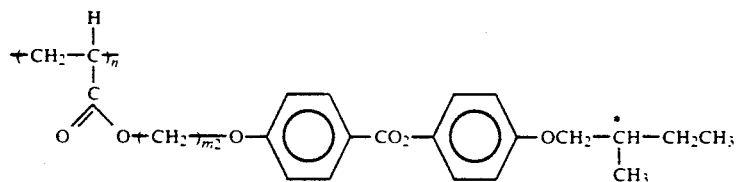
(24)
(m₂ = 2~15)
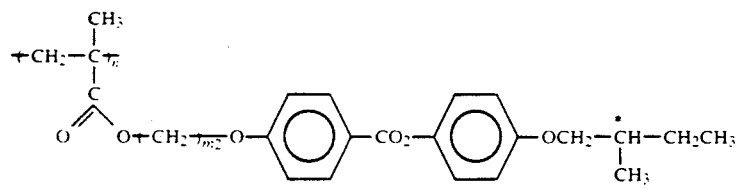
(25)
(m₂ = 2~15)
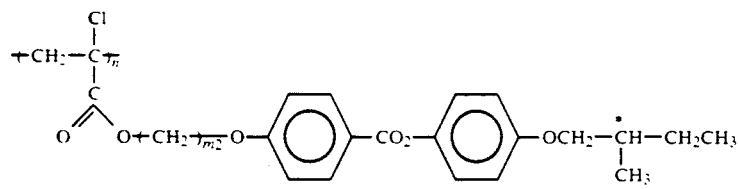
(26)
(m₂ = 2~15)
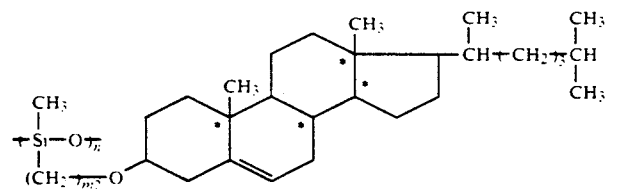
(27)
(m₂ = 2~15)
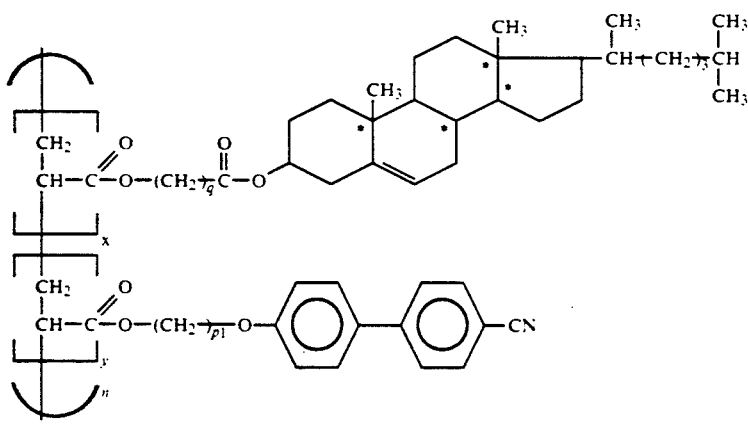
(28)
(x + y = 1, q = 1~10, p₁ = 1~10)

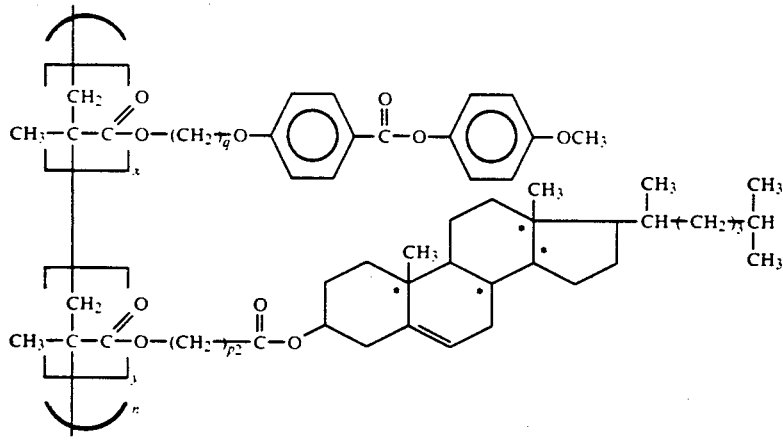
(29)
$(x + y = 1, q = 1\sim10, p_2 = 1\sim15)$
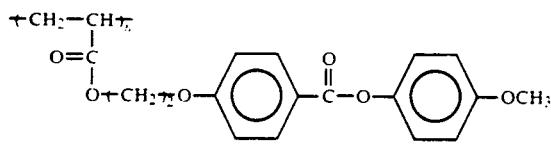
(30)
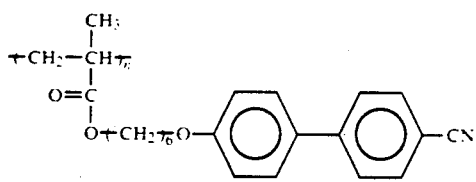
(31)
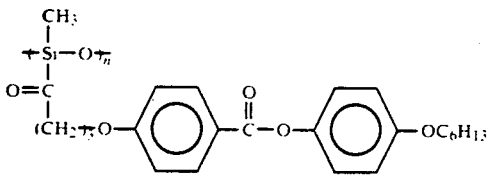
(32)
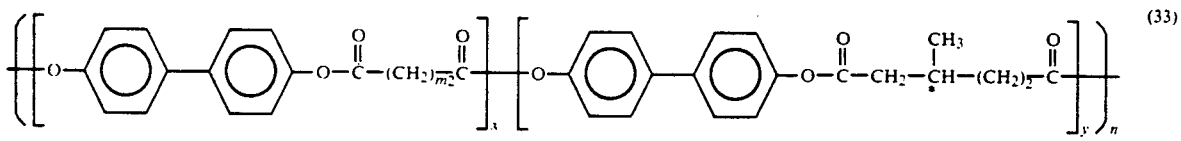
(33)
$(m_2 = 2\sim15, x + y = 1)$
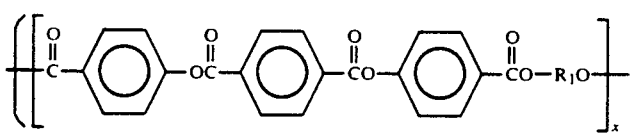
(34)
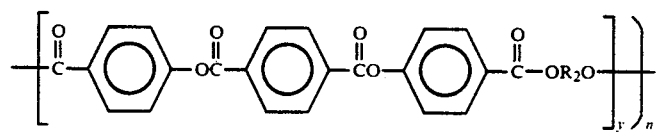
$R_1 = -CH_2CH_2CH{+}CH_2{\overline{73}}\ \ R_2 = {+}CH_2{\overline{m_2}}\ \ (x + y = 1, m_2 = 2\sim15)$ -continued
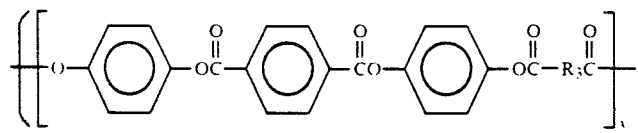   (35)
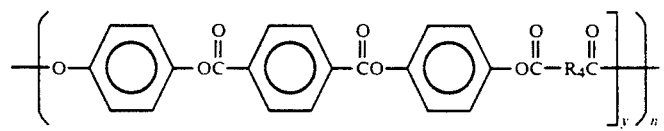
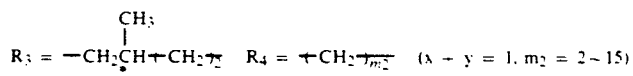
$R_3 = -CH_2CH(CH_3)CH_2\overset{*}{\phantom{C}}$  $R_4 = (CH_2)_{m_2}$  $(x + y = 1, m_2 = 2\sim15)$
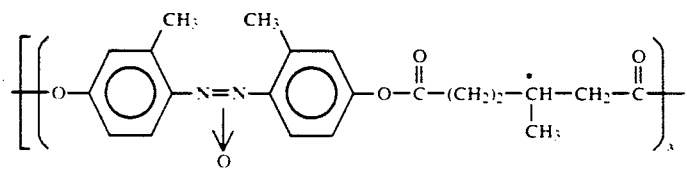   (36)
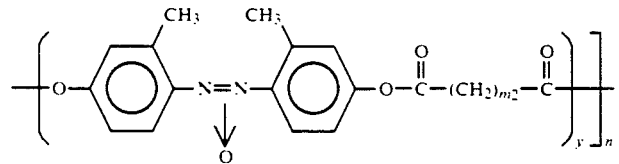
$(x + y = 1, m_2 = 2\sim15)$
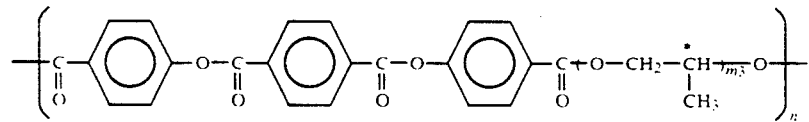   (37)
$(m_3 = 1\sim5)$
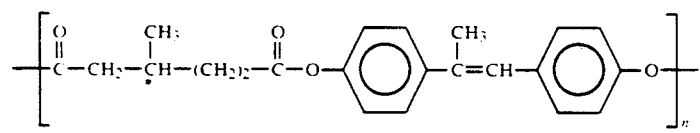   (38)
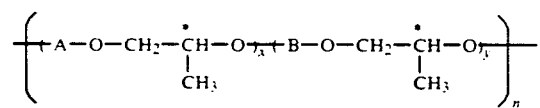   (39)
$A =$ 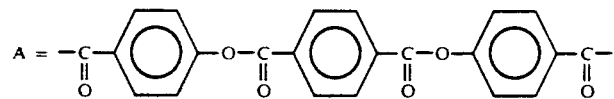
$B =$ 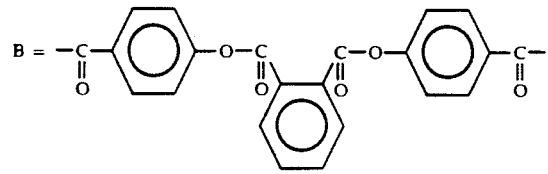
$(x + y = 1)$

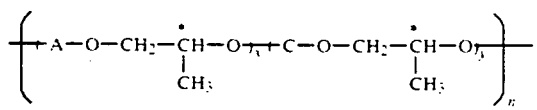
(40)
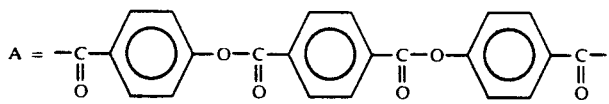
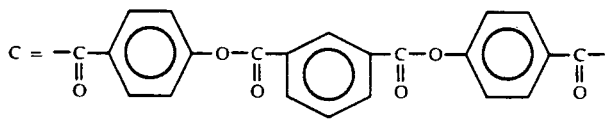
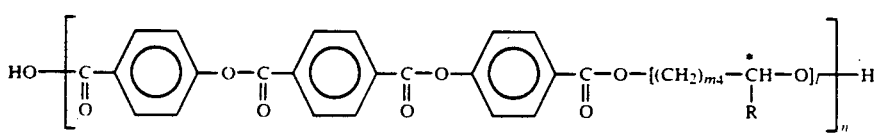
(41)
($m_4 = 1~3, l = 1~20$)
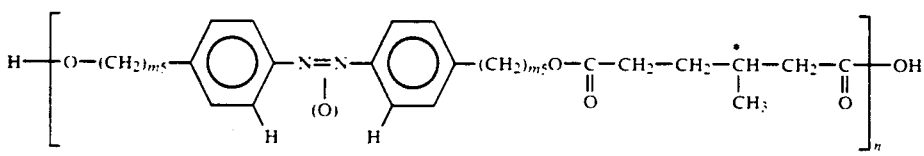
(42)
($m_5 = 0~5$)
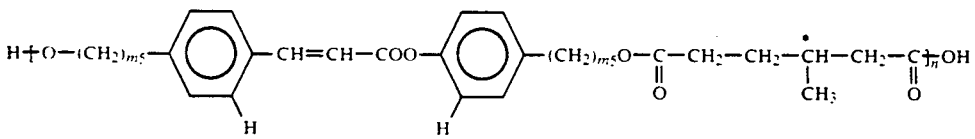
(43)
($m_5 = 0~5$)
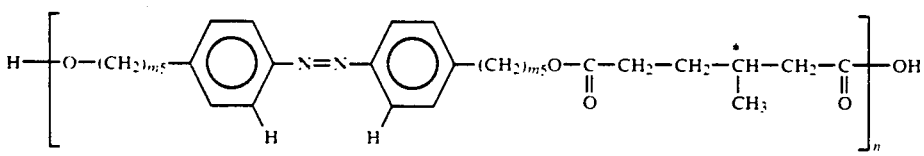
(44)
($m_5 = 0~5$)
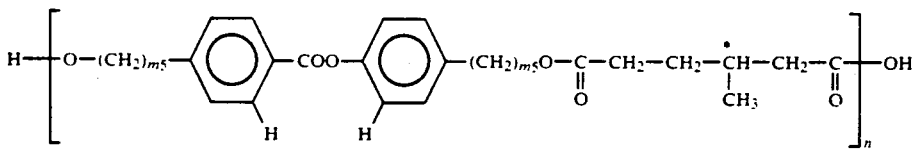
(45)
($m_5 = 0~5$)
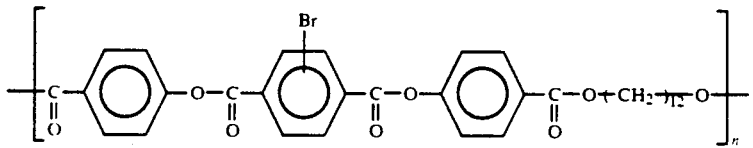
(46)
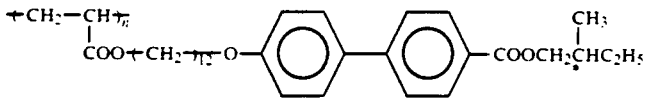
(47)

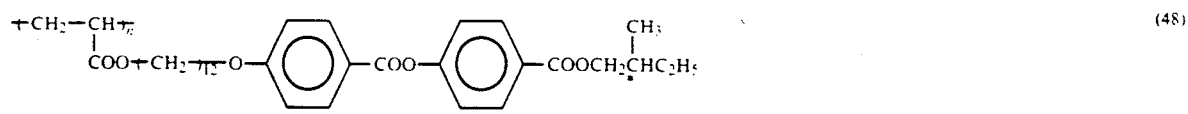 (48)
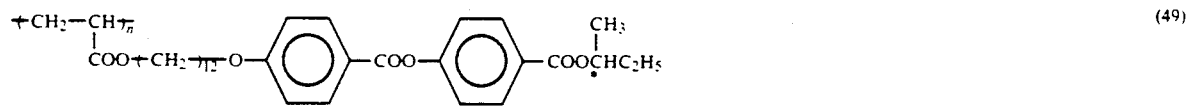 (49)
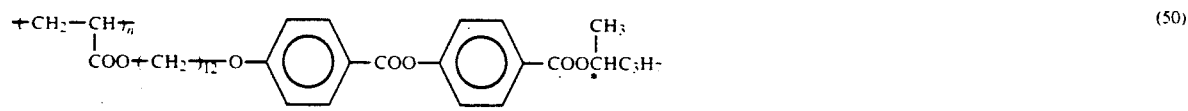 (50)
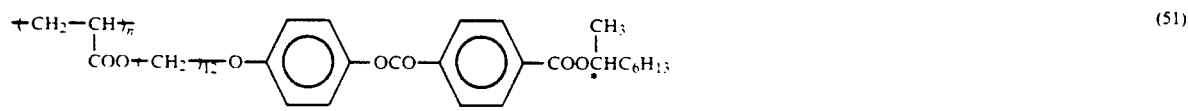 (51)
In the following, $m_6$ is 1 to 18.
 (52)
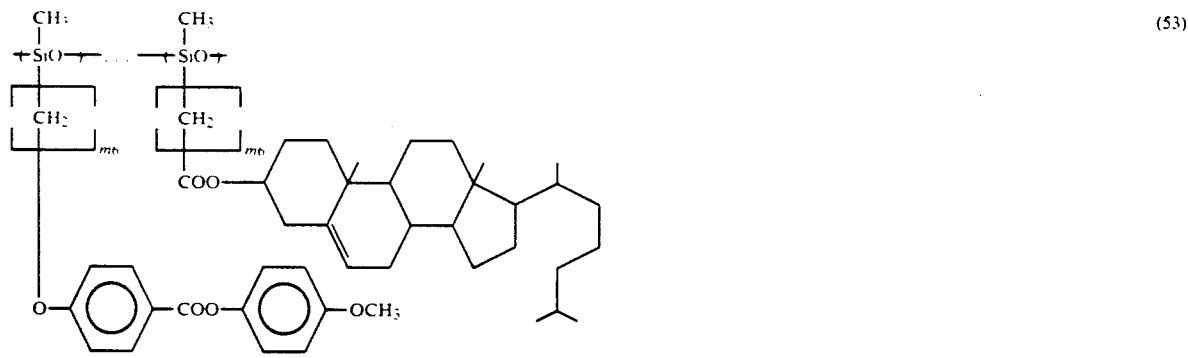 (53)
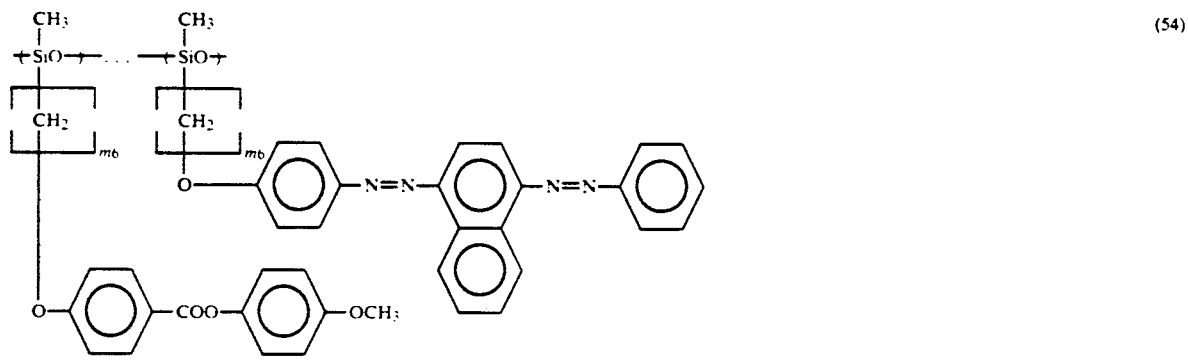 (54)

-continued
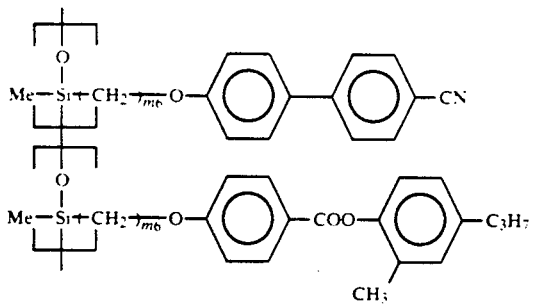 (55)
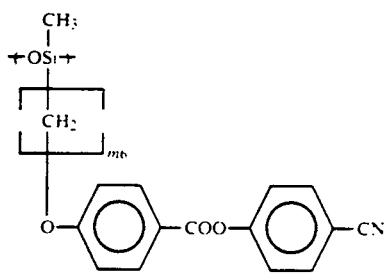 (56)
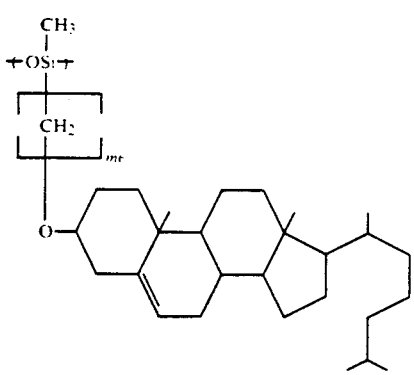 (57)
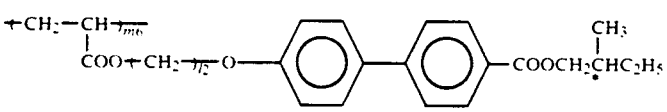 (58)
($l_2 = 5 \sim 18$)
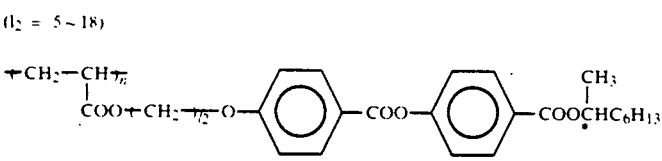 (59)
($l_2 = 5 \sim 18$)
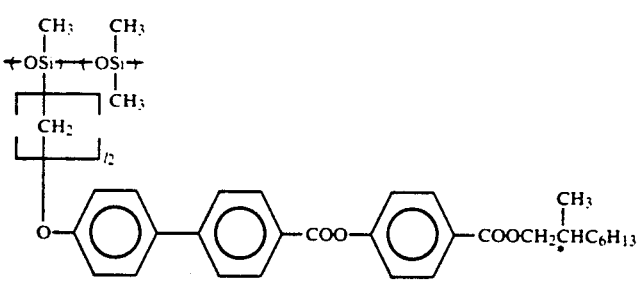 (60)
($l_2 = 5 \sim 18$)
The above polymer liquid crystal compound can be formed of a composition comprising a low-molecular liquid crystal compound. The low-molecular liquid crystal compound includes compounds having a nematic phase, a smectic phase, a chiral nematic phase, a chiral smectic phase, a discotic phase, or the like. Of these, the low-molecular liquid crystal compound having the chiral smectic phase includes, for example, the following:

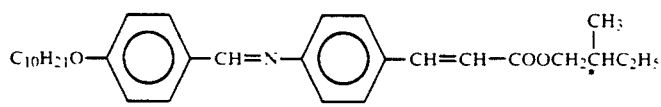

P-decyloxybenzylidene-p'-amino-2-methylbutyl cinnamate (DOBAMBC)

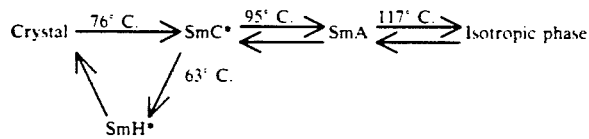

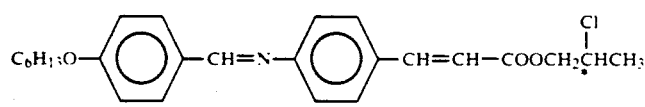

P-hexyloxybenzylidene-p'-amino-2-chloropropyl cinnamate (HOBACPC)

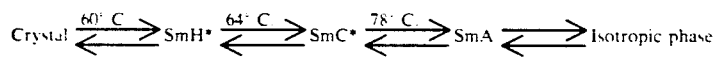

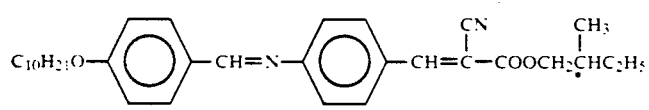

P-decyloxybenzylidene-p'-amino-2-methylbutyl-α-cyanocinnamate (DOBAMBCC)

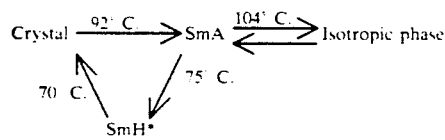

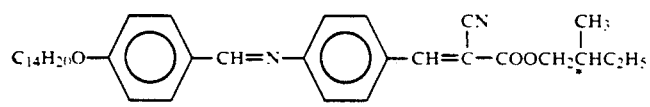

P-tetradecyloxybenzylidene-p'-amino-2-methylbutyl-α-cyanocinnamate (TDOBAMBCC)

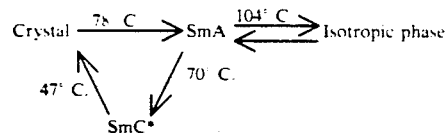

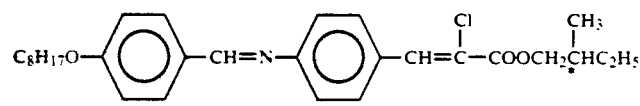

P-ocyloxybenzylidene-p'-amino-2-methylbutyl-α-chlorocinnamate (OOBAMBCC)

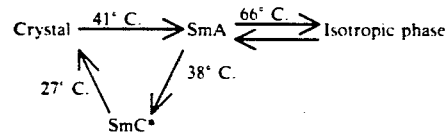

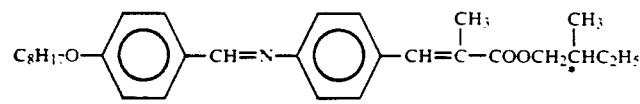

(a)

(b)

(c)

(d)

(e)

(f)

-continued

P-ocyloxybenzylidene-p'-amino-2-methylbutyl-α-methylcinnamate

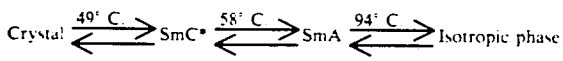

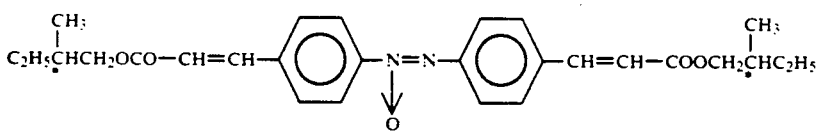

(g)

4,4'-azoxycinnamic acid-bis(2-methylbutyl) ester

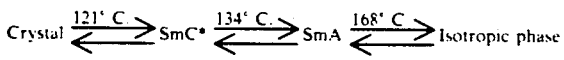

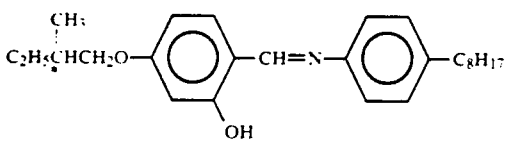

(h)

4-o-(2-methyl)-butylresorcylidene-4'-octylaniline (MBRA 8)

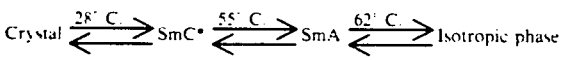

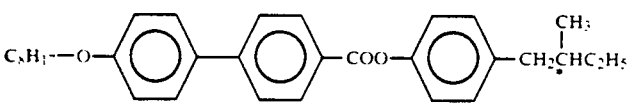

(i)

4-(2'-methylbutyl)phenyl-4'-octyloxybiphenyl-4-carboxylate

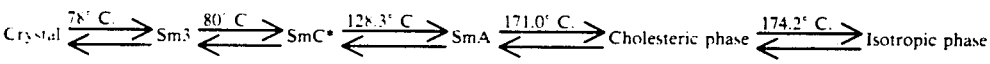

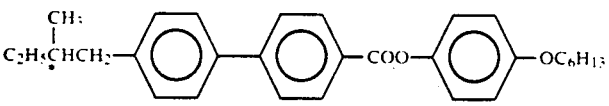

(j)

4-hexyloxyphenyl-4-(2'-methylbutyl)biphenyl-4'-carboxylate

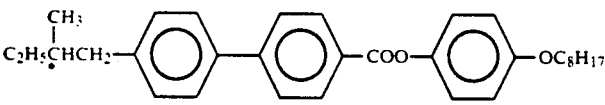

(k)

4-octyloxyphenyl-4-(2''-methylbutyl)biphenyl-4'-carboxylate

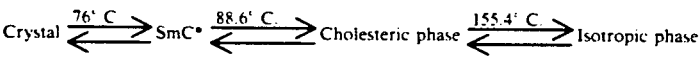

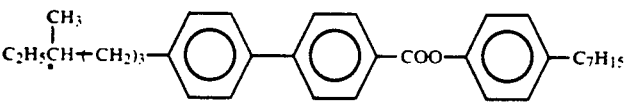

(l)

4-hexyloxyphenyl-4-(2''-methylbutyl)biphenyl-4'-carboxylate

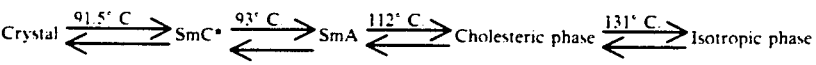

-continued

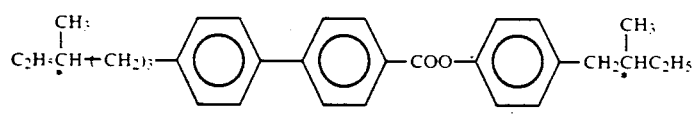

4-(2-methylbutyl)phenyl-4-(4''-methylhexyl)biphenyl-4'-carboxylate

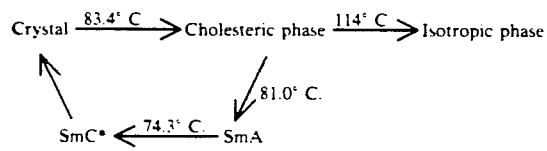

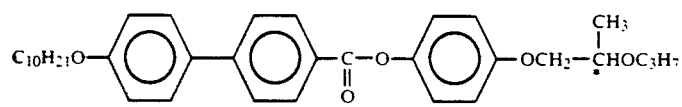

4-(2'-(propyloxy)propyl)oxyphenyl-4-(decyloxy)biphenyl-4'-carboxylate

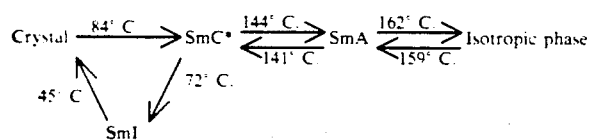

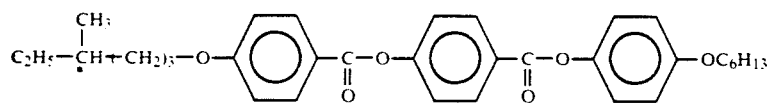

(4'-(4-hexyloxy)phenyloxycarbonyl)phenyl-p-(4''-methylhexyloxy)benzoate

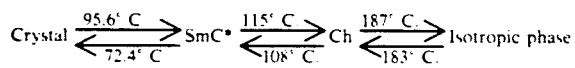

In instances in which the writing and erasing are carried out using a laser beam, a laser beam absorbing compound may be provided or a laser beam absorbing compound may be added to a polymer liquid crystal layer, whereby the sensitivity can be improved. The laser beam absorbing compound added to the polymer liquid crystal layer include, for example, the following:

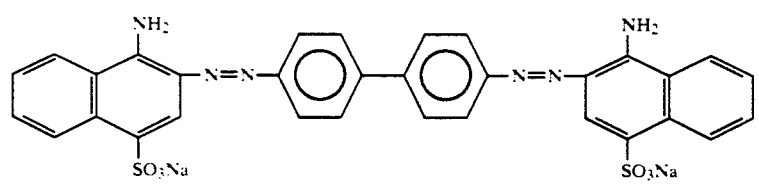
Direct Red 28

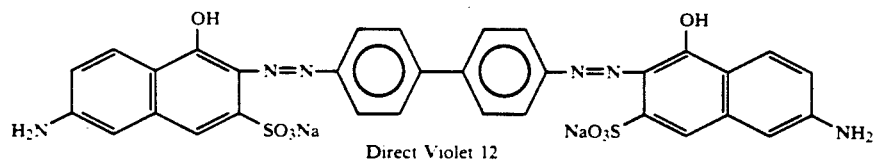
Direct Violet 12

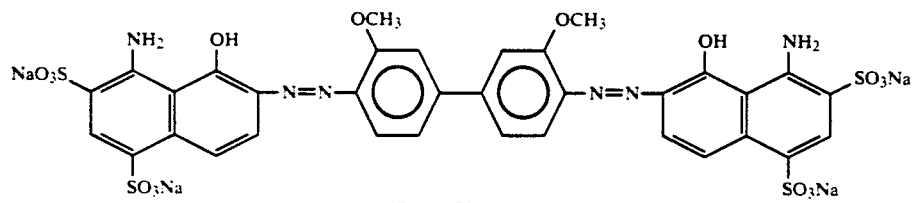
Direct Blue 1

-continued
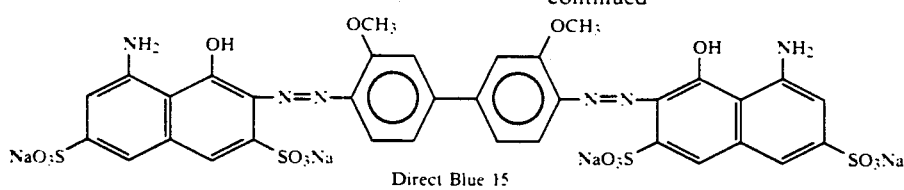
Direct Blue 15
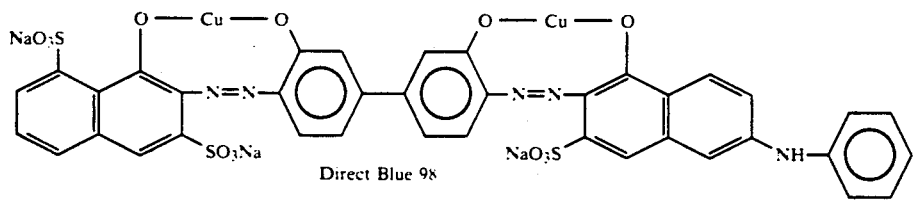
Direct Blue 98
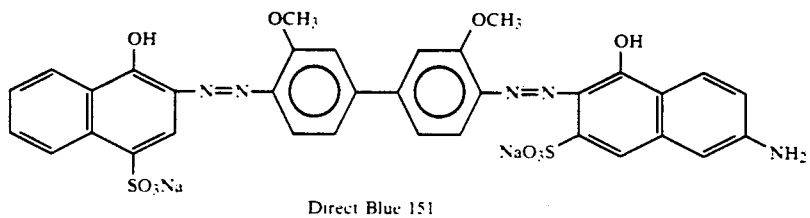
Direct Blue 151
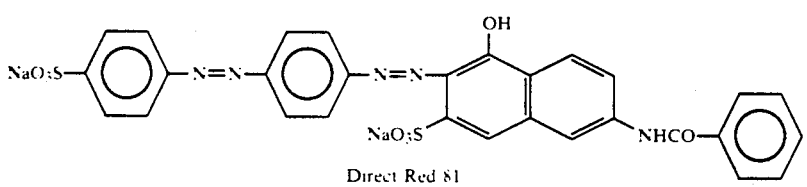
Direct Red 81
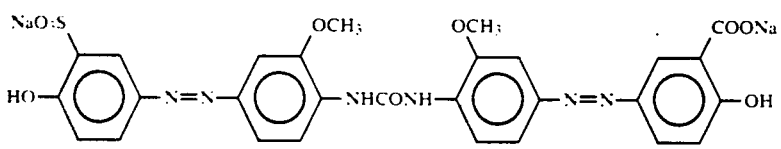
Direct Yellow 44
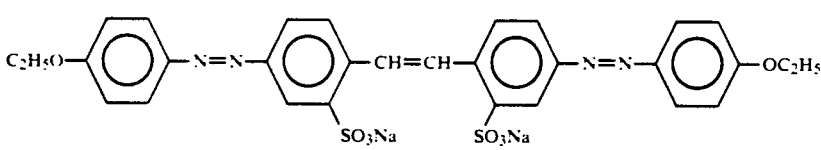
Direct Yellow 12
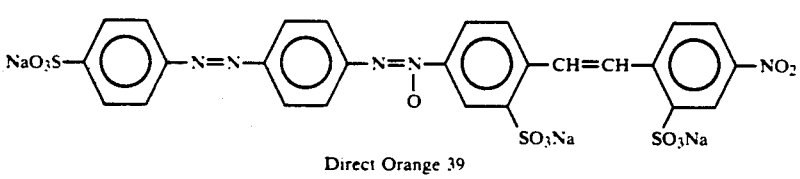
Direct Orange 39
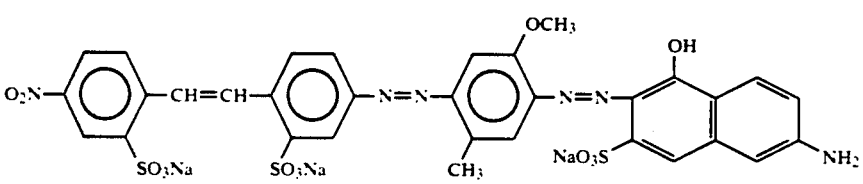

-continued
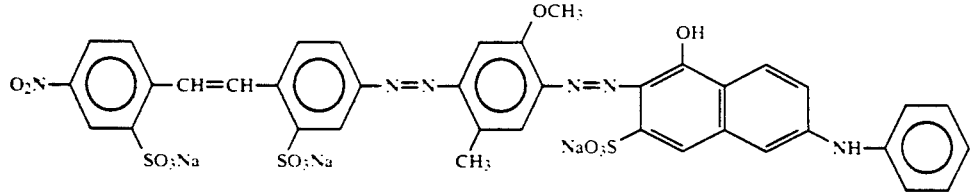
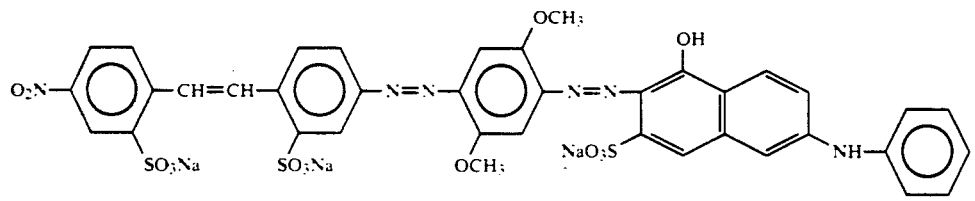
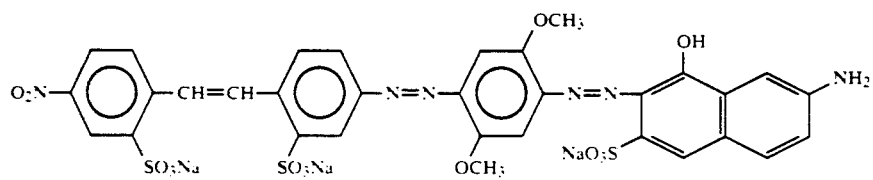
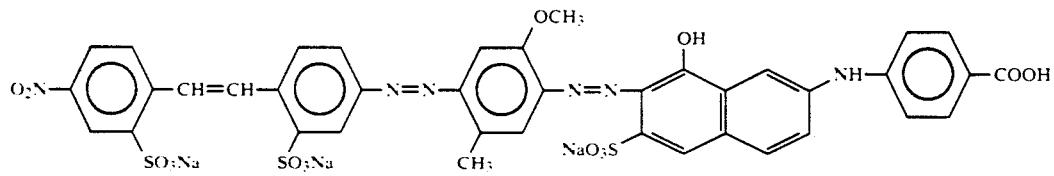
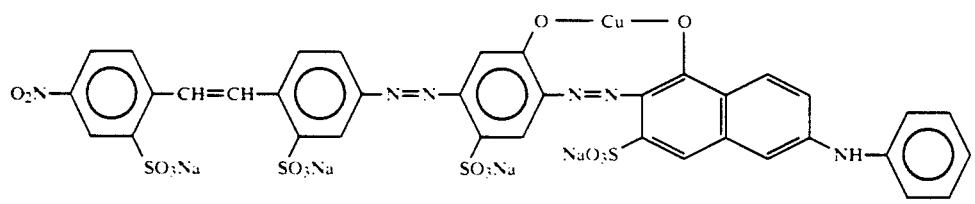
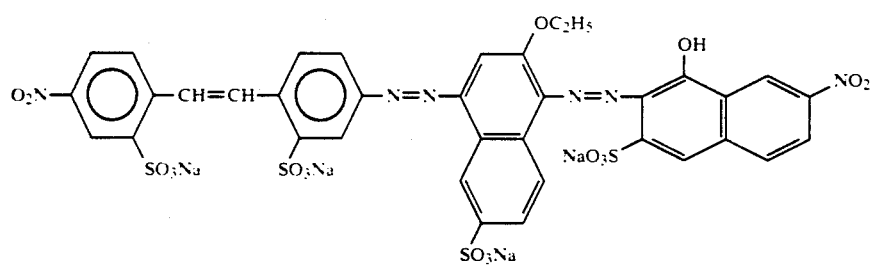
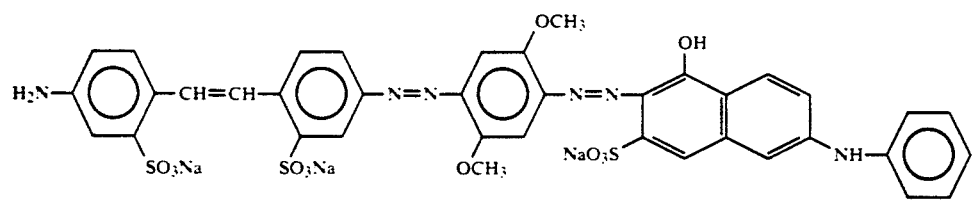
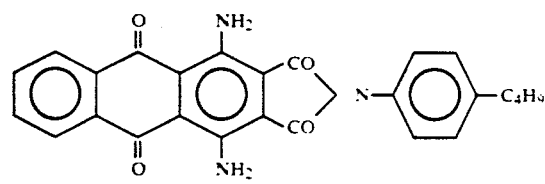

-continued
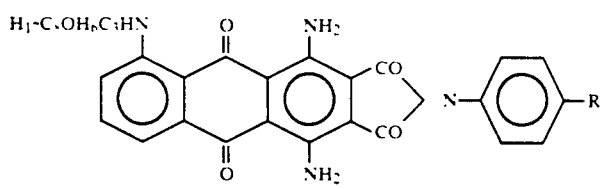
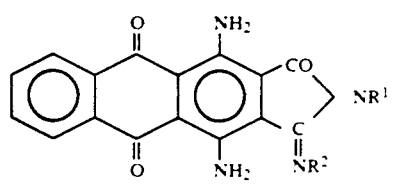
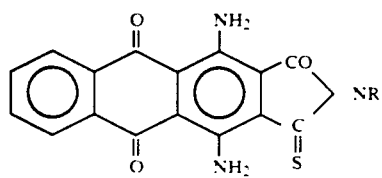
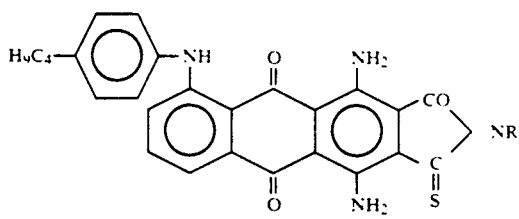
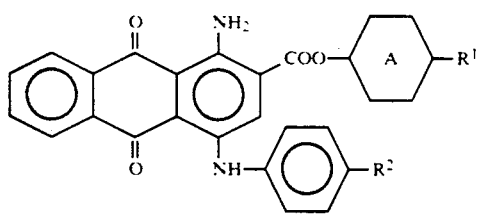
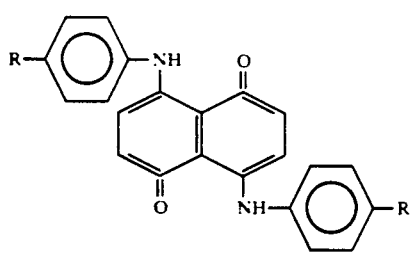
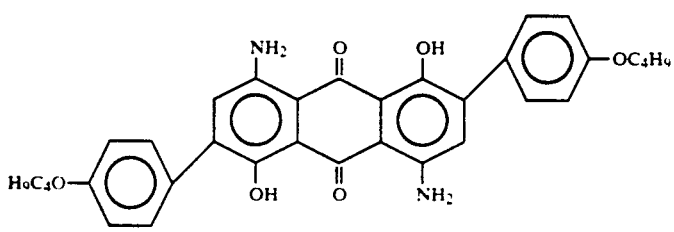

-continued
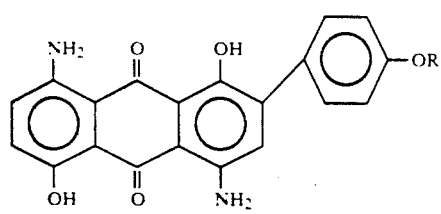
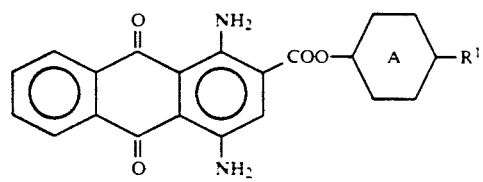
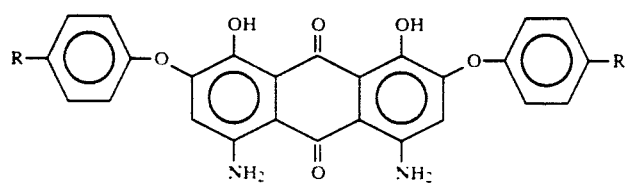
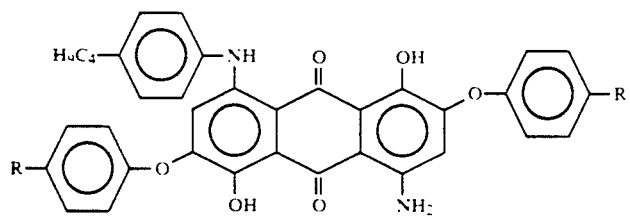
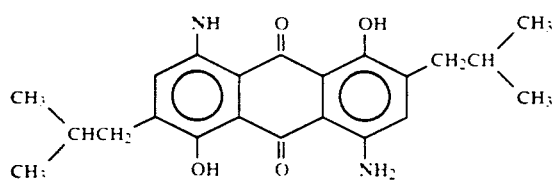
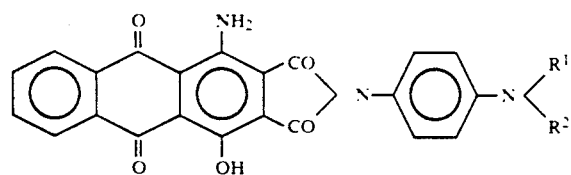
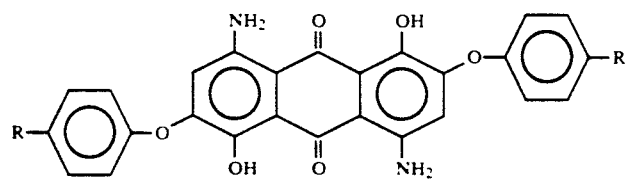
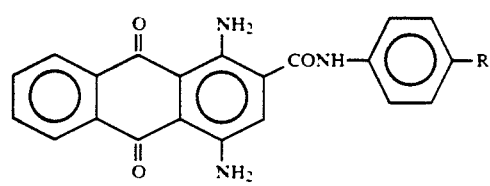

-continued
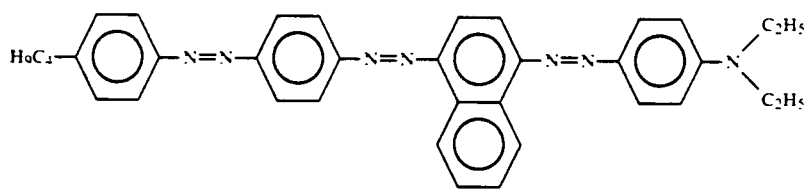
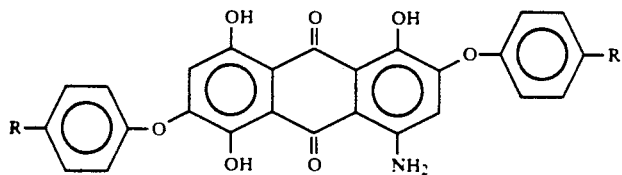
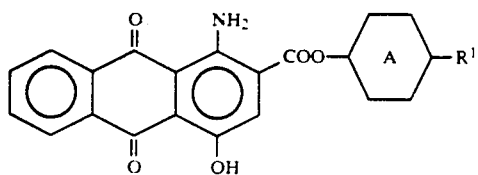
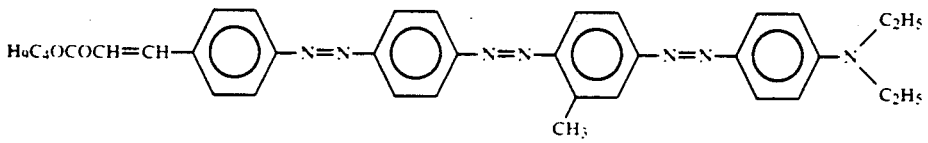
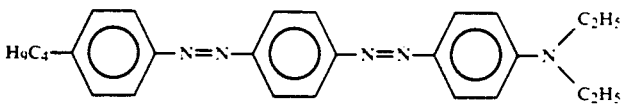
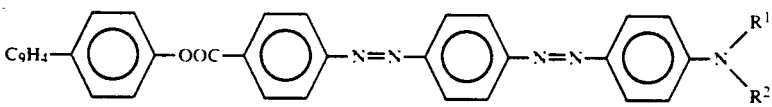
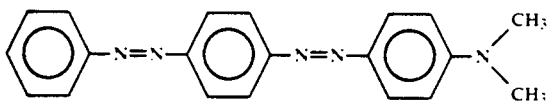
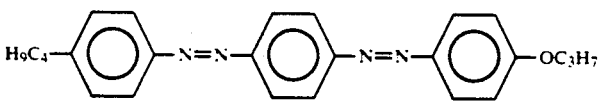
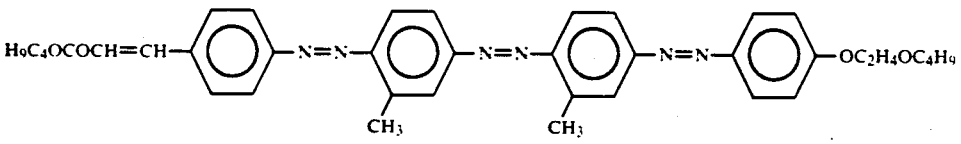
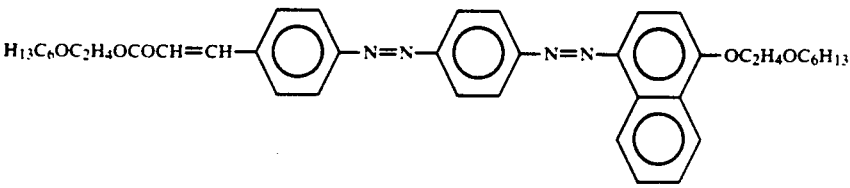

-continued
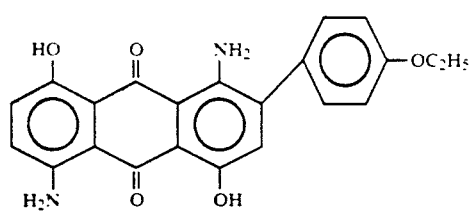
Disperse Blue 214
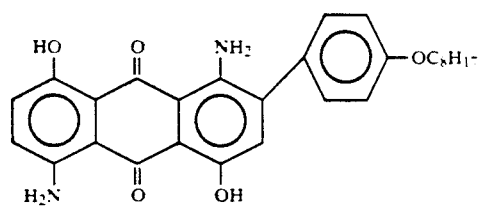
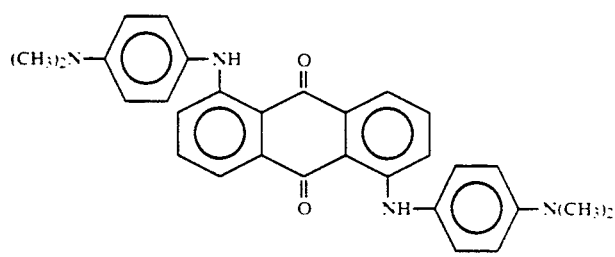
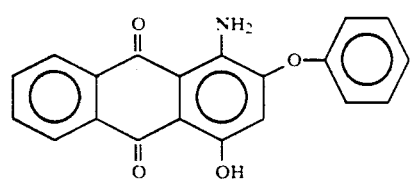
Disperse Red 60
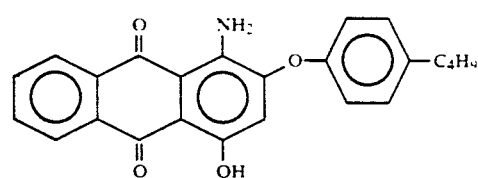
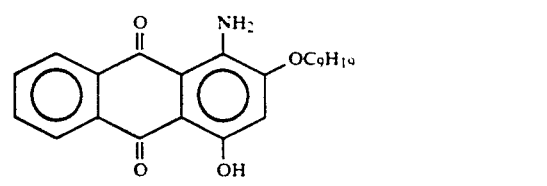
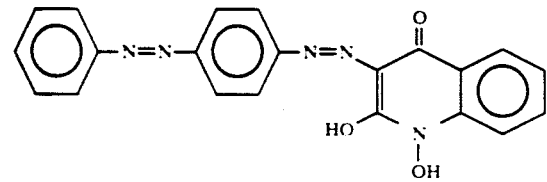
Disperse Yellow 56

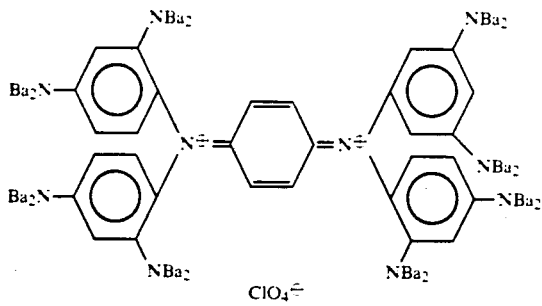

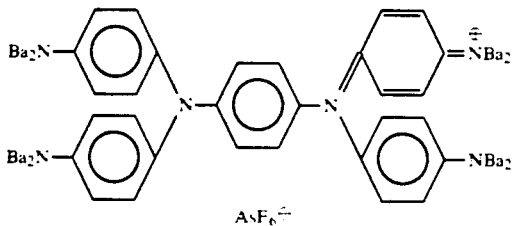

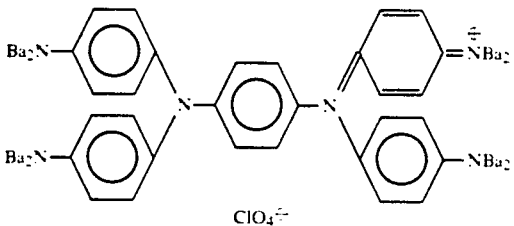

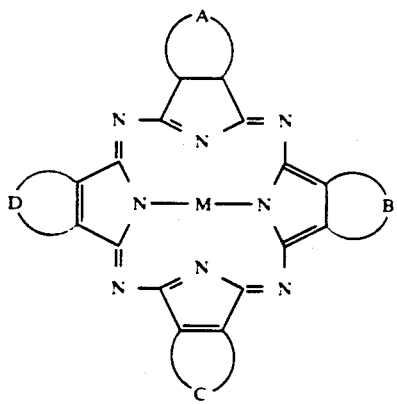

wherein ring ⬡A represents a cyclohexane ring

A laser beam absorbing compound suited for wavelengths of a semiconductor laser may also include the following:

Specifically used are phthalocyanines, naphthalocyanines, tetrabenzoporphyrins, and other substituted or unsubstituted porphyrins.

Particularly useful compounds include a phthalocyanine or a naphthalocyanine represented by the following Formula [I]:

[I]

in Formula [II], the letter symbol A represents

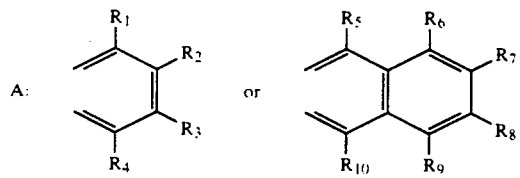

and B, C and D each represent

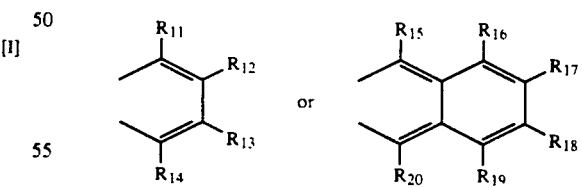

wherein $R_1$ to $R_{20}$ each represent a hydrogen atom, a straight-chain or branched alkyl group, alkoxy group or alkenyl group having 4 to 20 carbon atoms, or a substituent selected from the following group:

—$SiQ_1Q_2Q_3$

—$SQ_4$

—$COQ_5$

—$COOQ_6$

—NQ-Q₅ wherein $Q_1$ to $Q_8$ represent a hydrogen atom, or a straight-chain or branched alkyl group or alkenyl group having 1 to 20 carbon atoms, and M represents Ge, Sn, a transition metal, Al, Ca, In, an alkaline earth metal, a lanthanoid metal, an actinoid metal, or an oxide, halide or alkoxy compound thereof.

When optical recording is carried out, it is important for achieving compactness and high performance of a recording-reproducing apparaus to use a semiconductor laser having wavelengths from near infrared to red visible regions. Naphthalocyanines are particularly excellent as soluble organic macrocyclic dyes that can be used in such wavelength region.

In particular, a compound represented by Formula [II] has a superior solubility, and hence is suited for the recording medium of the present invention.

M represents Ge, Sn, a transition metal, Al, Ca, In, an alkaline earth metal, a lanthanoid metal or an actinoid metal;

X represents a halogen atom, an alkyl group, a carboxyl group, an alkoxy group, an ether group or an alkenyl group;

$Xm_1$ to $Xm_4$ each represent a halogen atom, an alkyl group, a sulfamoyl group, an ether group or an alkenyl group; and a to d each represent 0 to 4, provided that $a+b+c+d \geq 1$.

These compounds can be readily synthesized by the method as disclosed in Japanese Patent Laid-Open No. 90291/1986.

Other compounds usable as absorbents for the semiconductor laser beam include an aminium salt compound and a diimonium salt compound.

The aminium salt compound and the diimonium compound, used in the present invention, are represented by

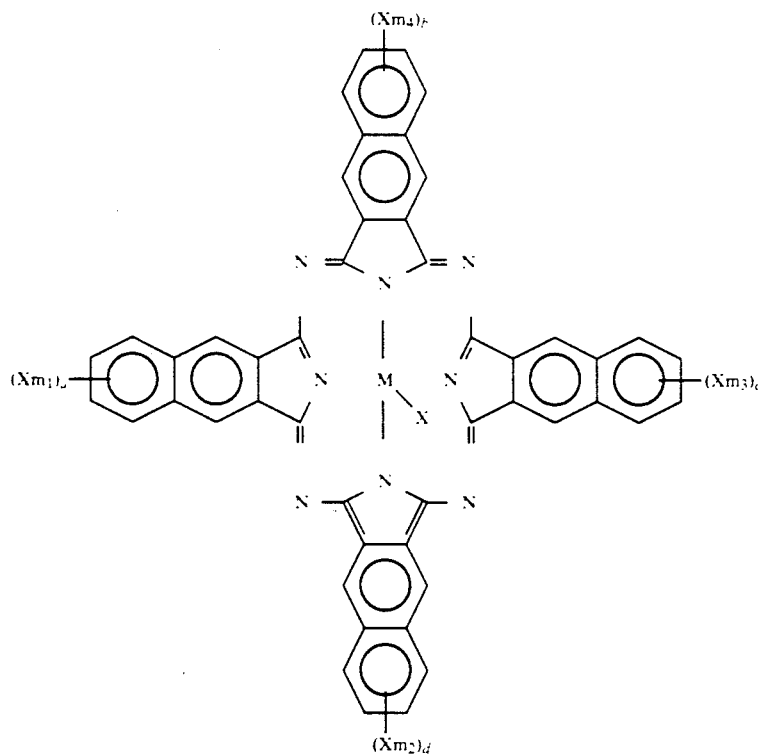

In Formula [II]:

the following Formula [III] or [IV] and Formula [V], respectively.

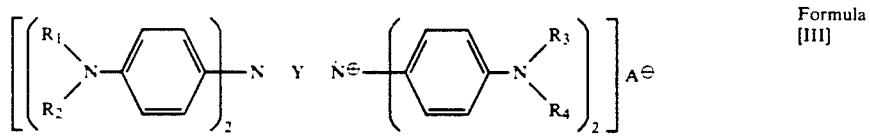

Formula [III]

Formula [IV]

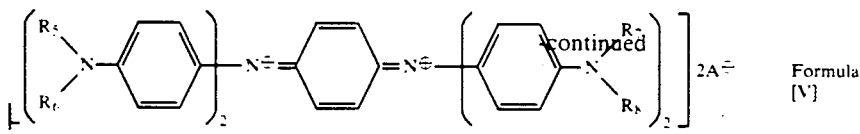

Formula [V]

In the above Formulas [III], [IV] and [V], $R_1$ to $R_{10}$ may be the same or different and each represent a hydrogen atom, or an alkyl group as exemplified by a methyl group, an ethyl group, a n-propyl group, an isopropyl group, a n-butyl group, a sec-butyl group, an iso-butyl group, a t butyl group, a n-amyl group, a t-amyl group, a n-hexyl group, a n-octyl group, a t-octyl group or a $C_9$–$C_{12}$ alkyl group: further including other alkyl groups, for example, a substituted alkyl group as exemplified by a 2-hydroxyethyl group, a 3-hydroxypropyl group, a 4-hydroxybutyl group, 2-acetoxyethyl group, a carboxymethyl group, a 2-carboxyethyl group, a 3-carboxypropyl group, a 2- sulfoethyl group, a 3-sulfopropyl group, a 4-sulfobutyl group, a 3-sulfatopropyl group, a 4-sulfatobutyl group, an N-(methylsulfonyl)-carbamylmethyl group or a 3 (acetylsulfamyl)propyl group, a 4-(acetylsulfamyl)butyl group, a cyclic alkyl group as exemplified by a cyclohexyl group, an alkenyl group as exemplified by a vinyl group, an allyl group, a propenyl group, a butenyl group, a pentenyl group, a hexenyl group, a heptenyl group, an octenyl group, a docecynyl group or a pulenyl group, an aralkyl group as exemplified by a benzyl group, a phenethyl group, an α-naphthylmethyl group or a β-naphthylmethyl group, and a substituted aralkyl group as exemplified by a carboxybenzyl group, a sulfobenzyl group or a hydroxybenzyl group.

Y represents

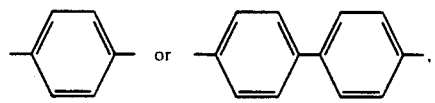

and the aromatic ring may be substituted by an alkyl group, a halogen atom or an alkoxy group.

$A\ominus$ represents an anion, as exemplified by perchlorate, fluoroborate, iodide, chloride, bromide, sulfate, periodide, or p-toluenesulfonate.

These aminium salt compounds and diimonium salt compounds can be synthesized according to the synthesis method as disclosed in Japanese Patent Publication No. 25335/1968, etc.

Typical examples of the aminium compound represented by the above Formula [III] or [IV] are listed in Table 1 shown below.

TABLE 1

| Compound No | Formula | Y | $R_1$ | $R_2$ | $R_3$ | $R_4$ | $A\ominus$ |
|---|---|---|---|---|---|---|---|
| AM-1 | [III] | ⌬ | $CH_3$ | ← | ← | ← | $AsF_6\ominus$ |
| AM-2 | [III] | ⌬ | $CH_3$ | ← | ← | ← | $ClO_4\ominus$ |
| AM-3 | [III] | ⌬ | $CH_3$ | ← | ← | ← | $SbF_6\ominus$ |
| AM-4 | [III] | ⌬ | $C_2H_5$ | ← | ← | ← | $AsF_6\ominus$ |
| AM-5 | [III] | ⌬ | $C_2H_5$ | ← | ← | ← | $ClO_4\ominus$ |
| AM-6 | [III] | ⌬ | $C_2H_5$ | ← | ← | ← | $BF_4\ominus$ |

TABLE 1-continued

| Compound No | Formula | Y | $R_1$ | $R_2$ | $R_3$ | $R_4$ | $A^\ominus$ |
|---|---|---|---|---|---|---|---|
| AM-7 | [III] |  | n-$C_3H_7$ | ← | ← | ← | $AsF_6^\ominus$ |
| AM-8 | [III] |  | iso-$C_3H_7$ | ← | ← | ← | $ClO_4^\ominus$ |
| AM-9 | [III] | 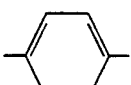 | n-$C_4H_9$ | ← | ← | ← | $ClO_4^\ominus$ |
| AM-10 | [III] |  | n-$C_4H_9$ | ← | ← | ← | $AsF_6^\ominus$ |
| AM-11 | [III] | 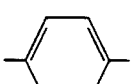 | n-$C_4H_9$ | ← | ← | ← | $SbF_6^\ominus$ |
| AM-12 | [III] | 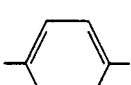 | n-$C_4H_9$ | ← | ← | ← | $BF_4^\ominus$ |
| AM-13 | [III] | 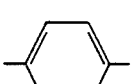 | n-$C_4H_9$ | ← | ← | ← | $I^\ominus$ |
| AM-14 | [III] | 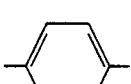 | n-$C_4H_9$ | ← | ← | ← | 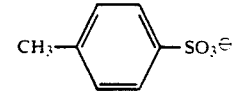 |
| AM-15 | [III] |  | t-$C_4H_9$ | ← | ← | ← | $ClO_4^\ominus$ |
| AM-16 | [III] |  | t-$C_4H_9$ | ← | $CH_3$ | ← | $AsF_6^\ominus$ |
| AM-17 | [III] | 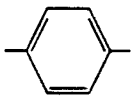 | n-$C_6H_{13}$ | ← | ← | ← | $ClO_4^\ominus$ |
| AM-18 | [III] | 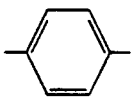 | n-$C_8H_{17}$ | ← | ← | ← | $AsF_6^\ominus$ |
| AM-19 | [III] | 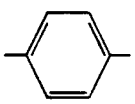 | n-$C_{12}H_{25}$ | ← | ← | ← | $SbF_6^\ominus$ |

TABLE 1-continued

| Compound No | Formula | Y | R₁ | R₂ | R₃ | R₄ | A⁻ |
|---|---|---|---|---|---|---|---|
| AM-20 | [III] | biphenyl | CH₃ | ← | ← | ← | AsF₆⁻ |
| AM-21 | [III] | biphenyl | C₂H₅ | ← | ← | ← | ClO₄⁻ |
| AM-22 | [III] | biphenyl | C₂H₅ | ← | CH₃ | ← | AsF₆⁻ |
| AM-23 | [III] | biphenyl | C₂H₅ | ← | ← | ← | SbF₆⁻ |
| AM-24 | [III] | phenyl | C₂H₄OH | ← | ← | ← | SbF₆⁻ |
| AM-25 | [III] | phenyl | C₂H₄OH | ← | ← | ← | ClO₄⁻ |
| AM-26 | [III] | phenyl | C₂H₄OH | ← | ← | ← | NO₃⁻ |
| AM-27 | [III] | biphenyl | C₂H₄OH | ← | ← | ← | SbF₆⁻ |
| AM-28 | [IV] | — | R₉ = C₂H₅ | | R₁₀ = C₂H₅ | | ClO₄⁻ |
| AM-29 | [IV] | — | R₉ = n-C₄H₉ | | R₁₀ = n-C₄H₉ | | ClO₄⁻ |

Typical examples of the diimonium compound represented by the above Formula [V] are listed in Table 2 shown below.

TABLE 2

| Compound No. | R₅ | R₆ | R₇ | R₈ | A⁻ |
|---|---|---|---|---|---|
| IM-1 | CH₃ | ← | ← | ← | AsF₆⁻ |
| IM-2 | CH₃ | ← | ← | ← | ClO₄⁻ |
| IM-3 | CH₃ | ← | ← | ← | SbF₆⁻ |
| IM-4 | C₂H₅ | ← | ← | ← | AsF₆⁻ |
| IM-5 | C₂H₅ | ← | ← | ← | ClO₄⁻ |
| IM-6 | C₂H₅ | ← | ← | ← | BF₄⁻ |

TABLE 2-continued

| Compound No. | R5 | R6 | R7 | R8 | A⁻ |
|---|---|---|---|---|---|
| IM-7 | n-C3H7 | ← | ← | ← | $AsF_6^-$ |
| IM-8 | iso-C3H7 | ← | ← | ← | $ClO_4^-$ |
| IM-9 | n-C4H9 | ← | ← | ← | $ClO_4^-$ |
| IM-10 | n-C4H9 | ← | ← | ← | $AsF_6^-$ |
| IM-11 | n-C4H9 | ← | ← | ← | $SbF_6^-$ |
| IM-12 | n-C4H9 | ← | ← | ← | $BF_4^-$ |
| IM-13 | n-C4H9 | ← | ← | ← | $I^-$ |
| IM-14 | n-C4H9 | ← | ← | ← | $CH_3\text{-}C_6H_4\text{-}SO_3^-$ |
| IM-15 | t-C4H9 | ← | ← | ← | $ClO_4^-$ |
| IM-16 | t-C4H9 | ← | ← | ← | $AsF_6^-$ |
| IM-17 | n-C6H13 | ← | ← | ← | $ClO_4^-$ |
| IM-18 | n-C8H17 | ← | ← | ← | $AsF_6^-$ |
| IM-19 | n-C12H25 | ← | ← | ← | $SbF_6^-$ |
| IM-20 | C2H4OH | ← | ← | ← | $SbF_6^-$ |
| IM-21 | C2H4OH | ← | ← | ← | $ClO_4^-$ |
| IM-22 | C2H4OH | ← | ← | ← | $NO_3^-$ |
| IM-23 | C2H4OH | ← | ← | ← | $SbF_6^-$ |

The above aminium salt compound (hereinafter "AM compound") and the diimonium salt compound (hereinafter "IM compound") have absorption in the near-infrared region, are useful as stable light-absorbing dyes, and have good compatibility with or dispersibility to the polymer liquid crystals.

An additional absorbent for the semiconductor laser beam includes the following metal chelate compounds. Examples of the metal chelate compounds used in the present invention are the compounds represented by the following Formula [1] to [7].

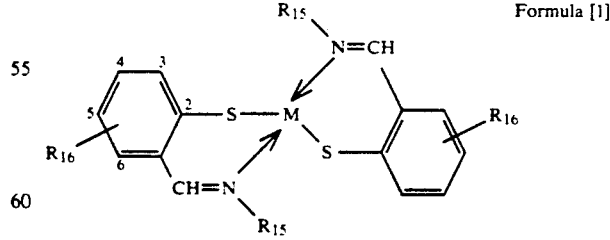

Formula [1]

In the formula, $R_{15}$ represents a hydrogen atom, a hydroxyl group, an alkyl group or an aryl group, and may combine with the other $R_{15}$. $R_{16}$ represents an alkyl group, a halogen atom, a hydrogen atom, a nitro group or a condensed ring group, and the central metal M represents Cu, Ni, Co or Pd.

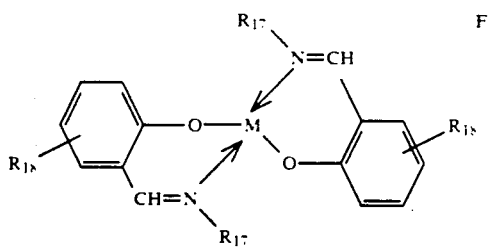

Formula [2]

In the formula, $R_{17}$ represents a hydrogen atom, a hydroxyl group, an alkyl group or an aryl group, end may combine with the other $R_{17}$. $R_{18}$ represents a hydrogen atom, a halogen atom, an alkyl group, a nitro group or a condensed ring group, and M represents Cu, Ni, Co or Pd.

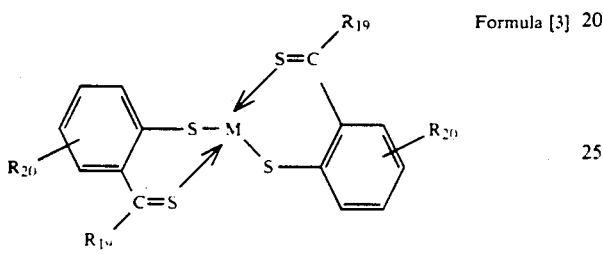

Formula [3]

In the formula, $R_{19}$ represents an alkyl group or an aryl group. $R_{20}$ represents a hydrogen atom, a halogen atom, an alkyl group, an aryl group, a nitro group or a condensed ring group. M represents Cu, Ni or Pd.

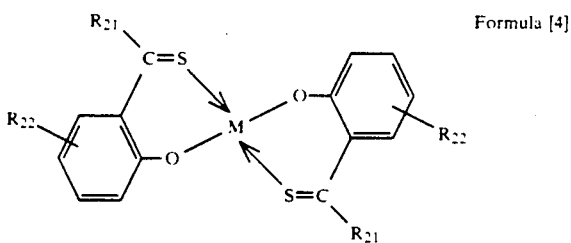

Formula [4]

In the formula, $R_{21}$ represents an alkyl group or an aryl group. $R_{22}$ represents a hydrogen atom, a halogen atom, an alkyl group or a condensed ring group. M represents Cu, Ni or Pd.

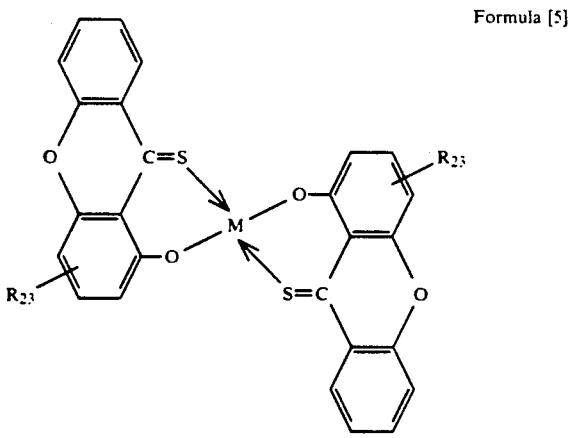

Formula [5]

In the formula, $R_{23}$ represents a hydrogen atom, a halogen atom or an alkyl group. M represents Cu or Ni.

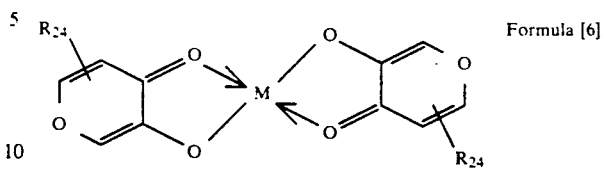

Formula [6]

In the formula, $R_{24}$ represents a hydrogen atom or an alkyl group. M represents Cu, Ni, Co or Mn.

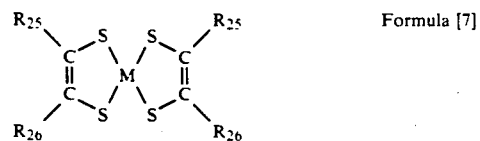

Formula [7]

In the formula, $R_{25}$ and $R_{26}$ each represent a substituted or unsubstituted alkyl group, an acyl group, or an aryl group, or $R_{25}$ and $R_{26}$ may combine to form an aromatic ring. M represents Cu, Ni, Co or Pd. In this instance, M may have a charge, and may have a counter ion.

Exemplary compounds of the metal chelate compounds represented by the above Formulas [1] to [7] are listed in Table 3 shown below, to which, however, the present invention is by no means limited.

TABLE 3

| Compound No. | Formula | M | Substituent | |
|---|---|---|---|---|
| 1 | [1] | Cu | $R_{15}$ = OH | $R_{16}$ = H |
| 2 | [1] | Ni | $R_{15}$ = OH | $R_{16}$ = H |
| 3 | [1] | Ni | $R_{15}$ = H | $R_{16}$ = 4-$C_2H_5$ |
| 4 | [1] | Ni | $R_{15}$ = $C_2H_5$ | $R_{16}$ = 5-Cl |
| 5 | [1] | Co | $R_{15}$ = i-$C_3H_7$ | $R_{16}$ = H |
| 6 | [1] | Ni | $R_{15}$ = n-$C_6H_{13}$ | $R_{16}$ = 4-$CH_3$ |
| 7 | [1] | Pd | $R_{15}$ = n-$C_6H_{13}$ | $R_{16}$ = 4-$CH_3$ |
| 8 | [1] | Ni | $R_{15}$ = $C_6H_5$ | $R_{16}$ = H |
| 9 | [1] | Ni | $R_{15}$ = H | $R_{16}$ = 5,6 |
| 10 | [1] | Ni | $R_{15}$ = —$CH_2$— | $R_{16}$ = 4-$NO_2$ |
| 11 | [2] | Cu | $R_{17}$ = H | $R_{18}$ = H |
| 12 | [2] | Ni | $R_{17}$ = $CH_3$ | $R_{18}$ = H |
| 13 | [2] | Cu | $R_{17}$ = OH | $R_{18}$ = 5-$C_2H_5$ |
| 14 | [2] | Ni | $R_{17}$ = $C_2H_5$ | $R_{18}$ = 5-$C_2H_5$ |
| 15 | [2] | Ni | $R_{17}$ = $C_3H_7$ | $R_{18}$ = 4-Cl |
| 16 | [2] | Ni | $R_{17}$ = $(CH_2)_5CH_3$ | $R_{18}$ = 4-$CH_3$ |
| 17 | [2] | Ni | $R_{17}$ = $(CH_2)_{11}CH_3$ | $R_{18}$ = 5,6 |
| 18 | [2] | Co | $R_{17}$ = i-$C_3H_7$ | $R_{18}$ = 5,6 |
| 19 | [2] | Co | $R_{17}$ = OH | $R_{18}$ = 4-$C_3H_7$ |
| 20 | [2] | Pd | $R_{17}$ = OH | $R_{18}$ = H |
| 21 | [2] | Ni | $R_{17}$ = —$CH_2$— | $R_{18}$ = 4-$NO_2$ |
| 22 | [2] | Cu | $R_{17}$ = —$CH_2$— | $R_{18}$ = 4-$NO_2$ |
| 23 | [3] | Ni | $R_{19}$ = $CH_3$ | $R_{20}$ = H |

TABLE 3-continued

| Compound No | Formula | M | Substituent | |
|---|---|---|---|---|
| 24 | [3] | Ni | $R_{19} = C_2H_5$ | $R_{20} = 4\text{-}CH_3$ |
| 25 | [3] | Ni | $R_{19} = C_6H_5$ | $R_{20} = 4\text{-}C_2H_5$ |
| 26 | [3] | Ni | $R_{19} = 4\text{-}(CH_3)_2N\text{-}C_6H_4$ | $R_{20} = H$ |
| 27 | [3] | Ni | $R_{19} = 4'\text{-}Cl\text{-}C_6H_4\text{-}$ | $R_{20} = 4\text{-}CH_3$ |
| 28 | [3] | Pd | $R_{19} = CH_3$ | $R_{20} = 4\text{-}CH_3$ |
| 29 | [3] | Pd | $R_{19} = C_2H_5$ | $R_{20} = 4\text{-}Cl$ |
| 30 | [3] | Ni | $R_{19} = CH_3$ | $R_{20} = 4\text{-}NO_2$ |
| 31 | [3] | Ni | $R_{19} = C_6H_5$ | $R_{20} = C_6H_5$ |
| 32 | [4] | Cu | $R_{21} = CH_3$ | $R_{22} = H$ |
| 33 | [4] | Cu | $R_{21} = C_2H_5$ | $R_{22} = 4\text{-}CH_3$ |
| 34 | [4] | Ni | $R_{21} = CH_3$ | $R_{22} = H$ |
| 35 | [4] | Ni | $R_{21} = C_3H_7$ | $R_{22} = 4\text{-}CH_3$ |
| 36 | [4] | Ni | $R_{21} = (C_2H_5)CH_3$ | $R_{22} = C_6H_5$ |
| 37 | [4] | Ni | $R_{21} = (CH_2)_5CH_3$ | $R_{22} = C_6H_5$ |
| 38 | [4] | Ni | $R_{21} = C_2H_5$ | $R_{22} = 5,6$ 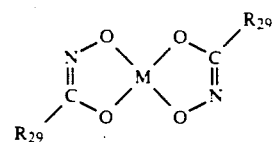 |
| 39 | [4] | Pd | $R_{21} = CH_3$ | $R_{22} = H$ |
| 40 | [4] | Pd | $R_{21} = (CH_2)_5CH_3$ | $R_{22} = 4\text{-}Cl$ |
| 41 | [5] | Cu | $R_{23} = H$ | |
| 42 | [5] | Ni | $R_{23} = H$ | |
| 43 | [5] | Ni | $R_{23} = 4\text{-}CH_3$ | |
| 44 | [6] | Mn | $R_{24} = H$ | |
| 45 | [6] | Ni | $R_{24} = H$ | |
| 46 | [6] | Ni | $R_{24} = 2\text{-}C_2H_5$ | |
| 47 | [7] | Cu | $R_{25} = C_6H_5$ | $R_{26} = C_6H_5$ |
| 48 | [7] | Ni | $R_{25} = C_6H_5$ | $R_{26} = C_6H_5$ |
| 49 | [7] | Ni | $R_{25} = P\text{-}(C_2H_5)_2N\text{-}C_6H_4$ | $R_{26} = C_6H_5$ |
| 50 | [7] | Ni | $R_{25} = P\text{-}(CH_3)_2N\text{-}C_6H_4$ | $R_{26} = C_6H_5$ |
| 51 | [7] | Ni | $R_{25} = CH_3CO$ | $R_{26} = CH_3CO$ |
| 52 | [7] | Ni | $-R_{25}-R_{26}- = -CH=CH-CH=CH-$ | |
| 53 | [7] | Ni | $-R_{25}-R_{26}- = -CH=C-C=CH-$ with Cl, Cl substituents | |
| 54 | [7] | Ni | $-R_{25}-R_{26}- = -CH=C-CH=CH-$ with $N(C_2H_5)_2$ | |
| 55 | [7] | Ni | $-R_{25}-R_{26}- = -CH=C-CH=CH-$ with $CH_3$ | |
| 56 | [7] | Ni | $-R_{25}-R_{26}- = -CH=C-C=CH-$ with $CH_3, CH_3$ | |
| 57 | [7] | Co | $-R_{25}-R_{26}- = -CH=CH-CH=CH-$ | |

The above metal chelate compounds, which have absorption in the near-infrared region, are useful as stable light-absorbing dyes, and have good compatibility with or dispersibility to the polymer liquid crystals.

An additional compound also useable as an absorbent for the semiconductor leaser beams includes the following:

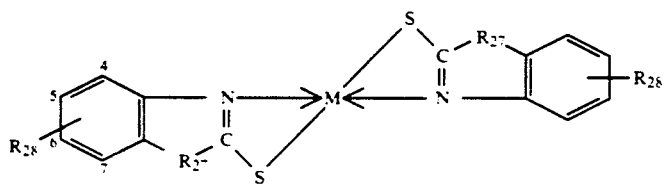

In the formula, $R_{27}$ represents a sulfur atom, a substituted or unsubstituted amino group, an oxygen atom or a thioketone group. $R_{28}$ represents a hydrogen atom, an alkyl group, a halogen atom or an amino group. M represents Zn, Cu or Ni.

Formula [9]

In the formula, $R_{29}$ represents an alkyl group an aryl group or a styryl group. M represents Cu, Ni or Co.

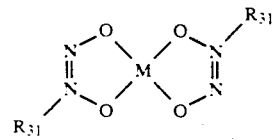

Formula [10]

In the formula, $R_{30}$ represents a hydrogen atom, a halogen atom, alkyl group, an acyl group or an aryl group. M represents Ni or Zr.

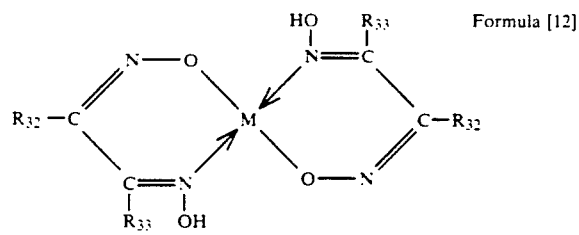

Formula [11]

In the formula, $R_{31}$ represents an alkyl group or an aryl group. M represents Cu, Ni or Co.

Formula [12]

In the formula, $R_{32}$ and $R_{33}$ each represent an alkyl group or an aryl group. M represents Ni.

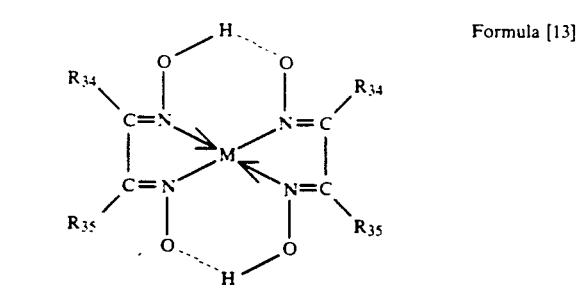

Formula [13]

In the formula, $R_{34}$ and $R_{35}$ each represent an alkyl

Formula [8]

group, an amino group, an aryl group or a furan group.

or $R_{34}$ and $R_{35}$ may combine to form an alicyclic compound. M represents Ni.

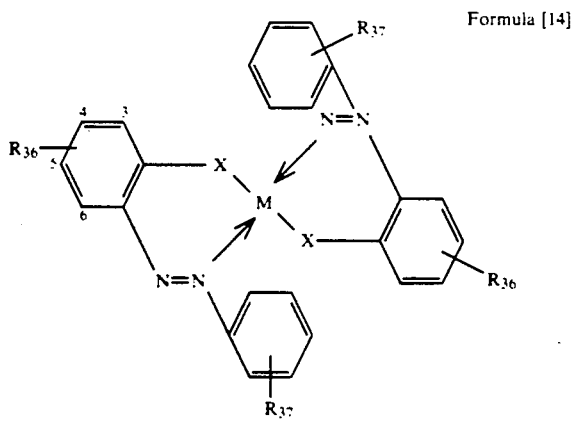

Formula [14]

In the formula, $R_{36}$ and $R_{37}$ each represent a hydrogen atom, a halogen atom or an alkyl group. X represents an oxygen atom or a sulfur atom. M represents Ni.

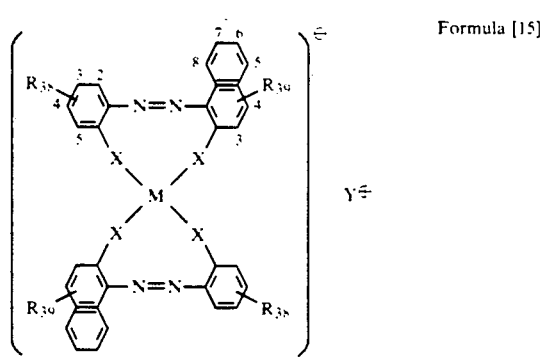

Formula [15]

In the formula, $R_{38}$ and $R_{39}$ each represent a hydrogen atom, an alkyl group, a halogen atom or a nitro group. X represents an oxygen atom or a sulfur atom. M represents Ni, and $Y\oplus$ represents a quaternary ammonium cation.

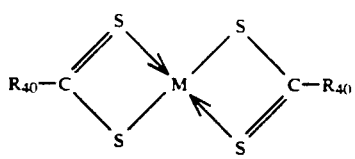

Formula [16]

In the formula, $R_{40}$ represents an amino group. M represents Cu, Ni, Co or Pd.

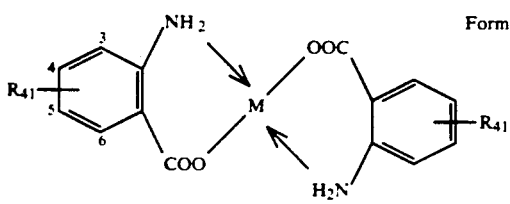

Formula [17]

In the formula, $R_{41}$ represents a hydrogen atom, a halogen atom, an alkyl group, an acyl group, a nitro group or an alkoxyl group. M represents Zn, Cu, Ni or Co.

Typical examples of the compounds represented by the above Formulae [8] to [17] are listed in Table 4 shown below, to which, however, the present invention is by no means limited.

TABLE 4

| Compound No. | Formula | M | Substituent | |
|---|---|---|---|---|
| 1 | [8] | Zn | $R_{27}$:O | $R_{28}$:H |
| 2 | [8] | Zn | $R_{27}$:O | $R_{28}$:5-$CH_3$ |
| 3 | [8] | Ni | $R_{27}$:S | $R_{28}$:H |
| 4 | [8] | Ni | $R_{27}$:S | $R_{28}$:5-Cl |
| 5 | [8] | Ni | $R_{27}$:S | $R_{28}$:5-$CH_3$ |
| 6 | [8] | Ni | $R_{27}$:S | $R_{28}$:4-$CH_3$ |
| 7 | [8] | Ni | $R_{27}$:S | $R_{28}$:5-$(CH_3)_2$N |
| 8 | [8] | Ni | $R_{27}$:NH | $R_{28}$:H |
| 9 | [8] | Ni | $R_{27}$:NH | $R_{28}$:5-$CH_3$ |
| 10 | [8] | Ni | $R_{27}$:$NCH_3$ | $R_{28}$:H |
| 11 | [8] | Ni | $R_{27}$:NH | $R_{28}$:6-$C_2H_5$ |
| 12 | [8] | Ni | $R_{27}$:C=S | $R_{28}$:H |
| 13 | [9] | Cu | $R_{29}$:$C_3H_7$ | |
| 14 | [9] | Ni | $R_{29}$:$C_6H_5$ | |
| 15 | [9] | Ni | $R_{29}$:$C_6H_5$CH=CH— | |
| 16 | [9] | Ni | $R_{29}$:Cl—$C_6H_4$CH=CH— | |
| 17 | [10] | Ni | $R_{30}$:H | X:— |
| 18 | [10] | Zr | $R_{30}$:H | X:Cl |
| 19 | [10] | Ni | $R_{30}$:$CH_3$CO | X:— |
| 20 | [10] | Ni | $R_{30}$:Cl | X:— |
| 21 | [10] | Ni | $R_{30}$:$C_3H_7$ | X:— |
| 22 | [11] | Cu | $R_{31}$:$C_3H_7$ | |
| 23 | [11] | Ni | $R_{31}$:$C_3H_7$ | |
| 24 | [11] | Cu | $R_{31}$:p-$(CH_3)_2$N—$C_6H_4$— | |
| 25 | [11] | Ni | $R_{31}$:p-$(CH_3)_2$N—$C_6H_4$— | |
| 26 | [12] | Ni | $R_{32}$:$CH_3$ | $R_{33}$:$CH_3$ |
| 27 | [12] | Ni | $R_{32}$:$C_2H_5$ | $R_{33}$:$C_2H_5$ |
| 28 | [12] | Ni | $R_{32}$:$C_6H_5$ | $R_{33}$:$C_6H_5$ |
| 29 | [13] | Ni | $R_{34}$:$NH_2$ | $R_{35}$:$NH_2$ |
| 30 | [13] | Ni | $R_{34}$:$C_6H_5$ | $R_{35}$:$C_6H_5$ |
| 31 | [13] | Ni | $R_{34}$: (furyl) | $R_{35}$: (furyl) |
| 32 | [13] | Ni | $R_{34}$:—$CH_2CH_2$— | $R_{35}$:—$CH_2CH_2$— |
| | | | ($R_{34}$ and $R_{35}$ combine to form a ring.) | |
| 33 | [13] | Ni | $R_{34}$:$CH_3$ | $R_{35}$:$CH_3$ |
| 34 | [13] | Ni | $R_{34}$:$C_2H_5$ | $R_{35}$:$C_2H_5$ |
| 35 | [14] | Ni | X:O | $R_{36}$:H | $R_{37}$:H |
| 36 | [14] | Ni | X:O | $R_{36}$:5-$CH_3$ | $R_{37}$:m-$CH_3$ |
| 37 | [14] | Ni | X:O | $R_{36}$:4-$CH_3$ | $R_{37}$:m-$CH_3$ |
| 38 | [14] | Ni | X:O | $R_{36}$:5-Cl | $R_{37}$:p-Cl |
| 39 | [14] | Ni | X:S | $R_{36}$:H | $R_{37}$:H |
| 40 | [14] | Ni | X:S | $R_{36}$:5-$CH_3$ | $R_{37}$:m-$CH_3$ |
| 41 | [14] | Ni | X:S | $R_{36}$:4-$CH_3$ | $R_{37}$:m-$C_2H_5$ |
| 42 | [14] | Ni | X:S | $R_{36}$:5-Cl | $R_{37}$:p-$C_2H_5$ |
| 43 | [15] | Ni | X:O | $R_{38}$:3-$CH_3$ | $R_{39}$:H |
| 44 | [15] | Ni | X:O | $R_{38}$:3-Cl | $R_{39}$:4-$CH_3$ |
| 45 | [15] | Ni | X:O | $R_{38}$:4-$NO_2$ | $R_{39}$:4-$CH_3$ |
| 46 | [15] | Ni | X:S | $R_{38}$:H | $R_{39}$:4-$CH_3$ |
| 47 | [15] | Ni | X:S | $R_{38}$:3-$NO_2$ | $R_{39}$:4-$C_2H_5$ |
| 48 | [16] | Ni | $R_{40}$:$(C_4H_9)_2$N | |
| 49 | [16] | Ni | $R_{40}$:$(C_5H_{11})_2$N | |
| 50 | [17] | Cu | $R_{41}$:H | |
| 51 | [17] | Ni | $R_{41}$:4-Cl | |
| 52 | [17] | Ni | $R_{41}$:4-$NO_2$ | |
| 53 | [17] | Ni | $R_{41}$:5-$CH_3$ | |

The above metal complexes used in the present invention can be synthesized according to the method as disclosed in Harry B. Gray et al., Journal of the American Chemical Society, Vol. 88, pp.43-50 and pp.4870-4875, or Schranzer and Maybake, Journal of the American Chemical Society, Vol. 87, pp.1483-1489.

The above compounds for semiconductor laser beams, which have absorption in the near infrared region, are useful as stable light-absorbing dyes, and have good compatibility with or dispersibility to the polymer liquid crystals. Some of these exhibit dichroism, and such compounds that exhibit dichroism may be mixed in the polymer liquid crystals, so that a thermally stable memory and display medium of a host-guest type can also be obtained.

Two or more kinds of the above compounds may be contained in the polymer liquid crystal compound.

The above compounds may also be used in combination with different types of near infrared absorbing dyes or dichroic dyes. Typical examples of the near-infrared absorbing dye that may be suitably used in combination are dyes such as cyanine, merocyanine, phthalocyanine, tetrahydrocholine, dioxazine, anthraquinone, triphenodithiazine, xanthene, triphenylmethane, pyrylium, croconium, azulene, and triphenylamine.

The above compounds may be added in the liquid crystals in an amount of approximately from 0.1% to 20%, and preferably from 0.5 to 10%, in % by weight. The polymer liquid crystal compound used in the present invention is a high-molecular thermotropic liquid crystal, and utilizes an intermediate phase, i.e., a nematic, smectic, chiralsmectic or cholesteric phase.

Figure 2:
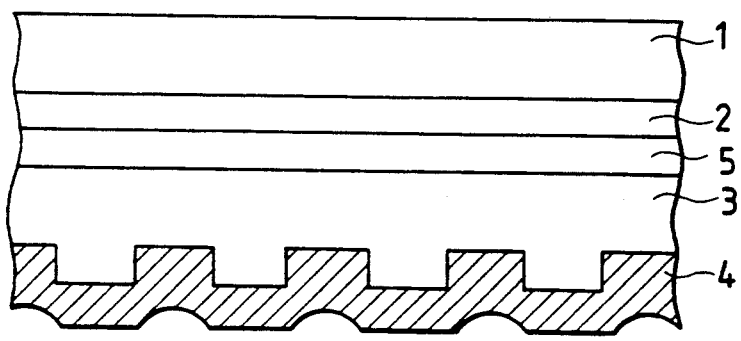
FIG. 2 cross-sectionally illustrates another example of the recording medium of the present invention.

FIG. 2 cross-sectionally illustrates another example of the recording medium of the present invention. The recording medium as shown in FIG. 2 comprises the substrate 1 comprised of a glass sheet, a plastic sheet or the like, and the transparent electrode 2 formed thereon with a plane surface or a given pattern.

The substrate 1 provided thereon with such the transparent electrode 2 may be provided with the alignment control film, which is an alignment control film 5 formed by coating by the use of, for example, an inorganic insulating material such as silicon monoxide, silicon dioxide, aluminum oxide, zirconia, magnesium fluoride, cerium oxide, cerium fluoride, silicon nitride, silicon carbide or boron nitride, or an organic insulating material such as polyvinyl alcohol, polyimide, polyamide imide, polyester imide, polyparaxylylene, polyester, polycarbonate, polyvinyl acetal, polyvinyl chloride, polyamide, polystyrene, cellulose resin, melamine resin, urea resin or acrylic resin.

This alignment control film 5 can be obtained by forming a coating of the inorganic insulating material or organic insulating material as described above, and thereafter rubbing with cloth, velvet or paper the surface of the coating in one direction.

In another preferred embodiment of the present invention, the alignment control film 5 can be obtained by forming a coating of an inorganic insulating material such as SiO or $SiO_2$ on the substrate 1 by oblique vacuum deposition.

In still another embodiment, a coating of the inorganic insulating material or organic insulating material as described above may be formed on the surface of, or above, the substrate 1 made of glass or plastics, and thereafter etching the surface of the resulting coating by oblique etching, thereby imparting alignment control effect to its surface.

The above alignment control film 5 may preferably also have a function as an insulating film at the same time. For this purpose, the alignment control film 5 may commonly have a film thickness set within the range of from 100 Å to 1 μm, and preferably from 500 Å to 5,000 Å. This insulating layer has even the advantage that it can prevent generation of electric currents that may be caused by impurities present in the recording layer 3 in a small amount. Hence, no deterioration of the polymer liquid crystal compound may occur even after repeated operations.

In the present invention, a means for surely carrying out molecular alignment of the polymer liquid crystal compound in the recording layer may preferably include stretching such as mono-axial stretching, biaxial stretching or inflation stretching, or rearrangement by sharing. It is effective from the veiwpoint of manufacture to carry out sharing when grooves are formed using a stamper. If the recording layer has no film properties alone and can be stretched with difficulty, it may be held between films and stretched together with the films, whereby the desired alignment can be attained.

As other methods for alignment, it is possible to make alignment using an electric field or a magnetic field, or alignment by sharing.

The recording layer containing the polymer liquid crystal compound of the present invention may not be subjected to alignment, and such a layer can also be used. In such an instance, the recording layer can be used in recording methods that utilize phase transition of liquid crystal phase/isotropic phase or liquid crystal phase/liquid crystal phase, or utilize a change in helical structure in a cholesteric phase or chiralsmectic phase can be utilized. When the recording layer subjected to no alignment is used, the recording layer should have a thickness of from 0.01 μm to 50 μm. A thickness less than 0.1 μm is not preferable since no contrast can be obtained. A thickness more than 50 μm may make it impossible to carry out effective tracking because of scattering caused by the disturbance of alignment. It should more preferably have a thickness of from 0.05 to 20 μm.

FIG. 3A to 3D each illustrate an example of the form of the groove of the recording layer containing the polymer liquid crystal compound, provided on a substrate. Results of experiments has confirmed that the dimensions of a groove exemplified in FIG. 4, i.e., the depth a of a groove, the width b of a groove and the land width c of a groove may preferably be such that the depth a of a groove is from 0.05 μm to 1 μm, the width b of a groove is from 0.5 μm to 2.0 μm, and the land width c of a groove is from 0.5 μm to 2.0 μm; in particular, the depth a of a groove is from 0.1 μm to 0.2 μm, the width b of a groove is from 0.5 μm to 1.0 μm, and the land width c of a groove is from 1.0 μm to 2.0 μm. However, even when all the above three conditions are not met, an aimed result can be obtained so long as the depth of a groove, among the above conditions, is set within the range as set forth above. It has been also confirmed that the shape of a groove has not so much influence.

Figure 5:
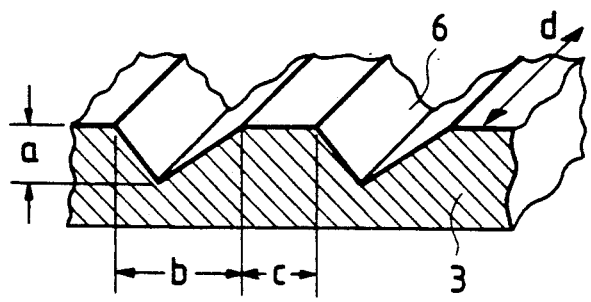

The grooves are preferably formed concentrically or spirally. However, even if the grooves are discontinuously, similar effects can be exhibited when a plurality of the grooves are provided and the length of groove d in FIG. 5 is made 0.1 μm to 10 μm. A plurality of groove-types of different shapes may be formed on the recording layer.

When the recording medium may be obtained by the use of the above specific disk substrate, it is thus possible to obtain a recording medium that can align uniformly in the direction of the spiral or concentric grooves when the recording layer held between substrates of this type is heated to a temperature higher than that of an isotropic transition, then is cooled slowly and aligned. As cross-sectionally illustrated in FIG. 6, it may have the constitution that the recording layer 3 is held between substrates only one of which is the substrate 1a with grooves and the other of which is the plane substrate 1. A liquid crystal layer with good alignment can be obtained if at least one of the substrates has the groove with the dimensions as defined in the present invention. Grooves can also be formed by transfer using a stamper, or by injection molding.

The constitution of a disk as illustrated in FIG. 7 can also be used, according to which an electric field can be applied. As an example, in FIG. 7, a disk has a cross-sectional structure that the recording layer 3 containing a polymer liquid crystal compound is disposed between a substrate 1a comprised of a substrate provided thereon with the conductive film 11 such as an ITO-deposited film and formed thereon the film 13 with groove structure, and another substrate 1 provided with a conductive film. This conductive film can have a reflective function of the reflective layer 4.

And also, even when the recording medium is in the form of a card or a tape, similar constitution with the recording medium in the form of disc may be possible FIG. 8 schematically illustrates an apparatus for recording and reproducing information, using the recording medium of the present invention. At the time of recording, the recording medium 7 is irradiated with light from the semiconductor laser 9 through an optical system. At the time of reproducing, light from the semiconductor laser 9 is once applied to the recording medium 7, and the light turned back can be read on the light detector 10 through a beam splitter.

EXAMPLES

The present invention will be described below in greater detail by giving Examples.

EXAMPLE 1

On a disk-like glass substrate of 130 mm in diameter and 1.2 mm in thickness, a solution obtained by adding in a polymer compound represented by the following structural formula (I) an IR absorbing dye represented by the following structural formula (II) in an amount of 1.0 wt. % and dissolving the resulting mixture in cyclohexanone was spin-coated to form a polymer liquid crystal layer with a dry film thickness of 2 μm.

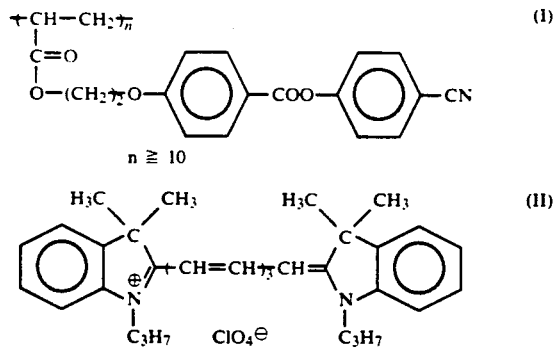

Figure 3A:
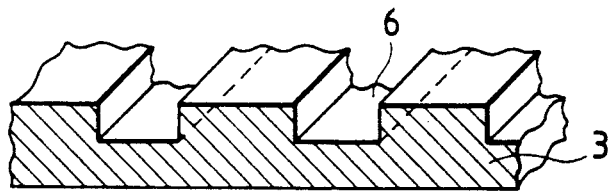
FIGS. 3A to 3D each diagramatically illustrate cross-sectional perspective forms of grooves on a recording layer.
Figure 4:
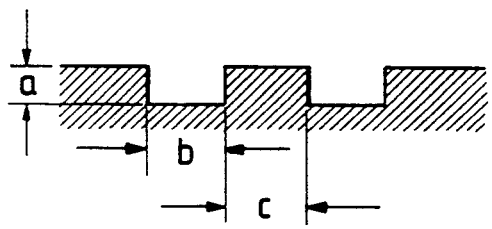
FIGS. 4 and 5 each are views to explain the dimensions of the groove on a recording layer.

Next, the substrate and a stamper were heated to 120° C., and the stamper was pressed onto the polymer liquid crystal layer to form a spiral groove, thereby monoaxial alignment is applied on the recording layer. The substrate was peeled from the stamper, and thereafter Al was vacuum-deposited on the polymer liquid crystal layer to form a reflective layer having the layer thickness of 3,000 Å. A recording layer with a groove having a cross-sectional form as illustrated in FIG. 3A was formed. The groove obtained had dimensions of the groove depth a of 0.08 μm, the groove width b of 1.0 μm, and the groove-land width c of 0.6 μm.

On the resulting recording medium, information was recorded at 8 mW and reproduced at 1 mW at a disk revolution number of 1,800 rpm, by irradiation with light from the substrate side, using a 830 nm semiconductor laser. As a result, tracking was kept in a good accuracy, and the reproduction C/N (resolution band width in spectral analysis of reproducing wave form: 30 kHz) was 45 dB at 1 MHz.

EXAMPLE 2

On a disk-like polycarbonate substrate of 130 mm in diameter and 1.0 mm in thickness, a mixture obtained by adding in a polymerizable monomer represented by the following structural formula (III) a photopolymerization initiator in an amount of 0.1 wt. % was coated with a thickness of 2 μm. Thereafter, at 90° C., using a stamper, grooves were formed in a concentric form by the transfer method, followed by curing with ultraviolet light. The resulting polymer liquid crystal layer exhibited a nematic phase at 40° to 110° C. On a recording layer thereof, an IR-absorbing dye represented by the following structural formula (IV) dissolved in alcohol was spin-coated to form a dye layer with a thickness of 500 Å. Next, Al was vacuum-deposited with a thickness of 5,000 Å, and then grooves were formed to have a cross-sectional form as illustrated in FIG. 5. The groove obtained had dimensions of the groove depth a of 1.0 μm, the groove width b of 1.0 μm, and the groove-land width c of 0.6 μm.

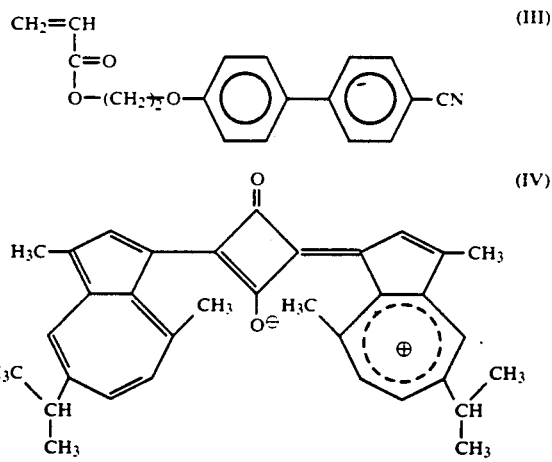

On the resulting recording medium, information was recorded at 8 mW and reproduced at 1 mW in the same manner as in Example 1, by irradiation with light from the substrate side, using a 830 nm semiconductor laser. As a result, tracking was attained in a good accuracy, and the reproduction C/N was 42 dB at 1 MHz.

EXAMPLE 3

On a 0.4 mm thick card-like substrate made of polycarbonate, an aqueous solution (solid content: 5 wt. %) of polyvinyl alcohol was spin-coated to give an alignment control layer with a dry thickness of 1,000 Å. The resulting layer was rubbed to impart monoaxial alignment. On the resulting substrate, a solution obtained by adding 1 wt. % (based on the polymer liquid crystal compound) of an IR-absorbing dye represented by the above structural formula (II) in a 15 wt. % cyclohexanone solution of the following polymer liquid crystal compound (V) was spin-coated to form a recording layer with a dry thickness of 1.0 μm,

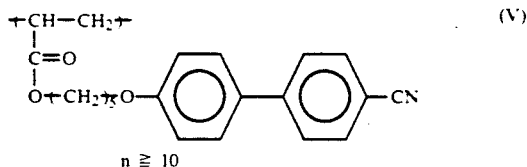

Figure 3B:
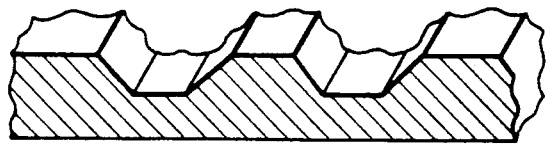
Figure 3C:
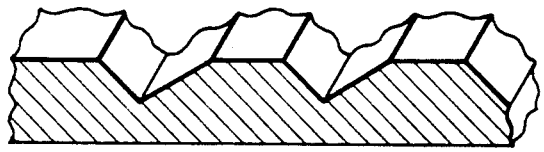
Figure 3D:
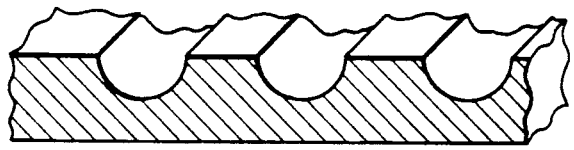

A stamper (groove depth a: 0.09 μm; groove width b: 2 μm; groove-land width c: 1 μm) having a groove form as shown in FIG. 3B was pressed onto the recording layer at 110° C. to transfer grooves thereon. On the polymer liquid crystal layer thus formed, Al was vacuum-deposited with a thickness of 3,000 Å to form a reflective layer. A 0.3 mm thick substrate made of polycarbonate on which an ultraviolet curable resin had been coated was laminated thereon, followed by curing by irradiation with ultraviolet rays.

On the resulting recording medium, information was recorded at 5 mW and reproduced at 0.5 mW, by irradiation with light from the 0.4 mm thick substrate side, using a 830 nm semiconductor laser. As a result, good tracking signals were obtained, and the reproduction C/N (resolution band width: 30 kHz) was 48 dB at 100 KHz.

COMPARATIVE EXAMPLE 1

On a disk-like glass substrate of 130 mm in diameter and 1.2 mm in thickness, a groove with the same form as in Example 1 was formed. A cyclohexanone solution with the same composition (20 wt. % of polymer liquid crystal compound (I)) as in Example 1 was then spin-coated thereon to form a polymer liquid crystal layer with a dry thickness of 1.5 μm. Next, on the polymer liquid crystal layer, Al was vacuum-deposited with a thickness of 3,000 Å to form a reflective layer.

On the resulting recording medium, it was attempted to record information at 8 mW at a disk revolution number of 1,800 rpm as in Example 1, by irradiation with light from the substrate side, using a 830 nm semiconductor laser. However, tracking was defective and it was impossible to carry out recording.

EXAMPLE 4

On a disk-like glass substrate of 130 mm in diameter and 1.2 mm in thickness, a 500 Å thick polyimide film (Sun Ever 100; a highly pure polyimide varnish, a product of Nissan Chemical Industries, Ltd.) was formed by baking at 270° C., and then the film was rubbed to apply monoaxial alignment.

Next, a cyclohexanone solution of the polymer liquid crystal as used in Example 3 was spin-coated to form a recording layer with a dry thickness of 1.0 μm. The recording layer had a glass transition temperature of 40° C. and an isotropic phase transition temperature of 115° C.

A stamper (groove depth a: 0.08 μm; groove width b: 1.0 μm; groove-land width c 0.6 μm) having a groove form as shown in FIG. 3A was pressed onto the recording layer at 100° C. to transfer grooves thereon. Next, on the polymer liquid crystal layer thus formed, Al was vacuum-deposited with a thickness of 3,000 Å to form a reflective layer.

On the resulting medium, information was recorded at 8 mW and reproduced at 0.5 mW at a disk revolution number of 1,800 rpm, by irradiation with light from the 1.2 mm thick substrate side, using a 830 nm semiconductor laser. As a result, good tracking was carried out, and the reproduction C/N (resolution band width: 30 kHz) was 50 dB at 1 MHz.

Examples in which Example 4 was followed under the same conditions except for changes of transfer temperature are shown in the following table.

|  | Transfer temp. | C/N |
|---|---|---|
| Example 5: | 80° C. | 45 dB |
| Example 6: | 100° C. | 49 dB |
| Comparative Example 2: | 180° C. | 38 dB |
| Comparative Example 3: | 35° C. | No tracking |

As having described above, according to the present invention, the groove is formed on the recording layer containing the polymer liquid crystal compound. Thus, it is made possible to carry out tracking with ease and also made possible to form the groove together with the recording layer on flat substrate, using a stamper, so that recording mediums with high accuracy can be obtained at a low cost.

Use of the recording layer comprising the polymer liquid crystal layer having a softening temperature lower than that Of a substrate also makes it possible to lengthen the lifetime of the stamper. It is still also possible to take a method in which a low viscosity prepolymer is poured into a mold on a substrate followed by curing. This gives the effect that the molding can be carried out at a low temperature.

What is claimed is:

1. A recording medium, comprising:
   a plane substrate without grooves; and
   a plane recording layer containing a polymer liquid crystal compound, said plane recording layer having two opposing sides,
   wherein said recording layer is grooved on one opposing side and is not grooved on the other opposing side,
   said plane substrate being located other than adjacent said side of said recording layer bearing said grooves.

2. The recording medium according to claim 1, wherein said recording medium further comprises a reflective layer.

3. A recording medium, comprising:
   a plane substrate;
   a reflective layer; and
   a recording layer containing a polymer liquid crystal compound,
   wherein said recording layer has grooves formed at its interface with said reflective layer.

4. The recording medium according to claims 1 or 3, wherein said grooves in said recording layer have a depth of from 500 Å to 1 μm.

5. The recording medium according to claim 4, wherein said grooves in said recording layer have a depth of from 0.1 μm to 0.2 μm.

6. The recording medium according to claims 1 or 3 wherein said recording medium is in the form of a disk, a card or a tape.

7. The recording medium according to claims 1 or 3, wherein said recording layer is formed of a composition comprising a polymer liquid crystal compound and a low-molecular liquid crystal compound.

8. The recording medium according to claims 1 or 3, wherein said recording layer contains a laser absorbing compound.

* * * * *

UNITED STATES PATENT AND TRADEMARK OFFICE
CERTIFICATE OF CORRECTION

PATENT NO. : 5,141,785
DATED      : August 25, 1992
INVENTOR(S): Kazuo Yoshinaga et al It is certified that error appears in the above-identified patent and that said Letters Patent is hereby corrected as shown below:

Title Page:

AT [19] UNITED STATES PATENT

"Yoshinada et al." should read --Yoshinaga et al.--.

AT [75] INVENTORS

"Kazuo Yoshinada," should read --Kazuo Yoshinaga,--.

COLUMN 39

Line 66, "Formula [II]," should read --Formula [I],--.

COLUMN 43

Form [V], " 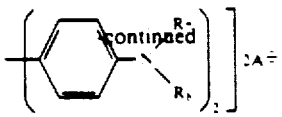 " should read

-- 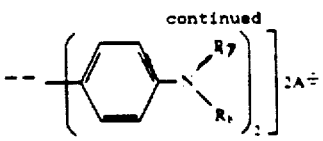 --.

Signed and Sealed this

Thirteenth Day of April, 1993

Attest:

STEPHEN G. KUNIN

Attesting Officer      Acting Commissioner of Patents and Trademarks